US009502708B2

(12) United States Patent
Wang et al.

(10) Patent No.: US 9,502,708 B2
(45) Date of Patent: Nov. 22, 2016

(54) OHMICALLY MODULATED BATTERY

(71) Applicant: EC Power, LLC, State College, PA (US)

(72) Inventors: Chao-Yang Wang, State College, PA (US); Shanhai GE, State College, PA (US)

(73) Assignee: EC Power, LLC, State College, PA (US)

( * ) Notice: Subject to any disclaimer, the term of this patent is extended or adjusted under 35 U.S.C. 154(b) by 195 days.

(21) Appl. No.: 14/267,648

(22) Filed: May 1, 2014

(65) Prior Publication Data

US 2015/0104681 A1  Apr. 16, 2015

Related U.S. Application Data

(60) Provisional application No. 61/890,012, filed on Oct. 11, 2013.

(51) Int. Cl.
*H01M 10/50* (2006.01)
*H01M 10/44* (2006.01)
*H01M 2/30* (2006.01)
*H01M 4/62* (2006.01)
*H01M 4/64* (2006.01)
*H01M 10/04* (2006.01)
*H01M 10/052* (2010.01)
*H01M 10/0587* (2010.01)
(Continued)

(52) U.S. Cl.
CPC ............... *H01M 2/30* (2013.01); *H01M 4/62* (2013.01); *H01M 4/64* (2013.01); *H01M 10/0431* (2013.01); *H01M 10/052* (2013.01); *H01M 10/0587* (2013.01); *H01M 10/4207* (2013.01); *H01M 10/4235* (2013.01); *H01M 10/441* (2013.01); *H01M 10/443* (2013.01); *H01M 10/482* (2013.01); *H01M 10/486* (2013.01); *H01M 2200/10* (2013.01); *H01M 2200/106* (2013.01); *Y02E 30/122* (2013.01)

(58) Field of Classification Search
CPC .... H01M 4/62; H01M 4/64; H01M 10/0431; H01M 10/052; H01M 10/0587; H01M 10/4207; H01M 10/4235; H01M 10/441; H01M 10/443; H01M 10/482; H01M 10/486
See application file for complete search history.

(56) References Cited

U.S. PATENT DOCUMENTS 6,072,301 A   6/2000 Ashtiani et al.
6,441,588 B1  8/2002 Yagi et al.
8,334,675 B2  12/2012 Wang et al.
(Continued)

FOREIGN PATENT DOCUMENTS

DE   102012210146 A1   12/2013
JP       9-92335 A      4/1997
(Continued)

OTHER PUBLICATIONS

G. Nagasubramanian, "Electrical characteristics of 18650 Li-ion cells at low temperatures," Journal of Applied Electrochemistry, 31 (2001) 99-104, 2001.

(Continued)

*Primary Examiner* — Helen O Conley
(74) *Attorney, Agent, or Firm* — McDermott Will & Emery LLP

(57) ABSTRACT

A rechargeable battery whose ohmic resistance is modulated according to temperature is disclosed.

21 Claims, 18 Drawing Sheets

(51) Int. Cl.
*H01M 10/42* (2006.01)
*H01M 10/48* (2006.01)

(56) References Cited

U.S. PATENT DOCUMENTS

| | | | | |
|---|---|---|---|---|
| 2001/0049050 | A1* | 12/2001 | Aragane | H01M 4/13 429/62 |
| 2003/0091892 | A1* | 5/2003 | Watanabe | H01M 4/13 429/62 |
| 2006/0275653 | A1 | 12/2006 | Chang et al. | |
| 2009/0087723 | A1 | 4/2009 | Inda | |
| 2010/0173179 | A1 | 7/2010 | Matthias | |
| 2012/0032642 | A1 | 2/2012 | Xu et al. | |
| 2013/0288089 | A1 | 10/2013 | Kinoshita et al. | |

FOREIGN PATENT DOCUMENTS

| | | |
|---|---|---|
| JP | 2002-369402 A | 12/2002 |
| JP | 2009-118729 A | 5/2009 |
| JP | 2010-205710 A | 9/2010 |
| JP | 2012-069280 A | 4/2012 |
| JP | 2012-69280 A | 4/2014 |
| JP | 2012-69496 A | 4/2014 |
| WO | 2013/186079 A1 | 12/2013 |

OTHER PUBLICATIONS

S.S. Zhang et al., "Electrochemical impedance study on the low temperature of Li-ion batteries," Electrochimica Acta, 49 (2004) 1057-1061.
H.P. Lin et al., "Low-Temperature Behavior of Li-Ion Cells," Electrochemical Solid-State Letters, 4 (6) A71-A73 (2001).
J. Fan et al., "Studies on Charging Lithium-Ion Cells at Low Temperatures," Journal of the Electrochemical Society, 153 (6) A1081-A1092 (2006).
C.K. Huang et al., "The Limits of Low-Temperature Performance of Li-Ion Cells," Journal of the Electrochemical Society, 147 (8) 2893-2896 (2000)
S.S. Zhang et al., "The low temperature performance of Li-ion batteries," Journal of Power Sources, 115 (2003) 137-140.
M.C. Smart et al., "Electrolytes for Low-Temperature Lithium Batteries Based on Ternary Mixtures of Aliphatic Carbonates," Journal of the Electrochemical Society, 146 (2) 486-492 (1999).
M.C. Smart et al., "Use of Organic Esters as Cosolvents in Electrolytes for Lithium-Ion Batteries with Improved Low Temperature Performance," Journal of The Electrochemical Society, 149 (4) A361-A370 (2002).
S.S. Zhang et al., "Low temperature performance of graphite electrode in Li-ion cells," Electrochimica Acta, 48 (2002) 241-246.
M. D. Zolot et al., "Thermal Evaluation of the Honda Insight Battery Pack," in: 36th Intersociety Energy Conversion Engineering Conference, Savannah, GA, 2001, pp. 923.
A. Pesaran et al., "Cooling and Preheating of Batteries in Hybrid Electric Vehicles," The 6th ASME-JSME Thermal Engineering Joint Conference, Hawaii Island, Hawaii, 2003.
S.S. Zhang et al., "Charge and discharge characteristics of a commerical LiCoO2-based 18650 Li-ion battery," Journal of Power Sources, 160 (2006) 1403-1409.
Y. Ji, et al., "Li-ion cell operation at low temperatures," J. Electrochemical Society, (2013) 160 (4) A636-649.
International Search Report and Written Opinion issued in International Patent Application No. PCT/US2014/059729, mailed on Jun. 29, 2015; 12 pages.
International Search Report and Written Opinion issued in International Patent Application No. PCT/US2014/059726, mailed on Jun. 26, 2015; 13 pages.
International Search Report issued in International Application No. PCT/US2014/037209 dated Sep. 2, 2014.
Ji, Y. et al., "Heating strategies for Li-ion batteries operated from subzero temperatures", Electrochimica Acta (2013) 107:664-674.
Non-final Office Action issued in U.S. Appl. No. 14/189,517 dated Dec. 30, 2015, 38 pgs.
Copending U.S. Appl. No. 14/255,780.

* cited by examiner

OHMICALLY MODULATED BATTERY

CROSS-REFERENCE TO RELATED APPLICATIONS

This application claims the benefit of U.S. Provisional Application No. 61/890,012, filed Oct. 11, 2013, the entire disclosure of which is hereby incorporated by reference herein.

TECHNICAL FIELD

The present invention relates generally to rechargeable batteries, and more particularly, to a rechargeable battery engineered to have more than one internal resistance levels. The internal resistance level changes substantially with temperature. Such batteries can have improved performance and safety and include lithium-ion batteries for electronics, vehicles, and grid energy storage.

BACKGROUND

Energy-dense rechargeable batteries for electronics, transportation and grid energy storage commonly suffer from low performance at low temperatures and safety problems at high temperatures. At low temperatures, especially subfreezing temperatures, rechargeable batteries, especially lithium-ion batteries, exhibit very low power performance and low energy due to sluggish electrochemical kinetics and transport processes occurring in the battery cell. At high temperatures, lithium-ion batteries have a strong tendency to undergo thermal runaway, leading to significant hazards. There is a need for rechargeable batteries with improved performance at low temperatures and/or improved high-temperature safety.

SUMMARY OF THE DISCLOSURE

An advantage of the present disclosure is an ohmically modulated rechargeable battery, such as a lithium ion battery engineered to have two or more internal resistance levels that can change substantially with battery temperature. The ohmic modulation mechanism can be implemented by either active or passive configurations. Advantageously, such batteries can be operated at one internal resistance level over one temperature range and at other internal resistance levels at other temperatures or ranges. The difference between various internal resistance levels can be a factor of two to fifty or higher. Switching between different resistance levels can improve the performance and safety of rechargeable batteries. For example, when the battery temperature rises above a normal operating range, e.g., about 45° C. to 55° C. or higher, the battery's internal ohmic resistance can increase sharply so that maximum charge/discharge current possible is kept at low levels, which in turn reduces the internal heat generation substantially. The combination of much lower maximum possible current and much lower internal heat generation rate promotes battery safety at high temperatures.

These and other advantages are satisfied, at least in part, by a rechargeable battery comprising one level of internal resistance ($R_1$) over a temperature range of the battery between a first temperature ($T_1$) and a second temperature ($T_2$), and a second level of internal resistance ($R_2$) outside of either $T_1$ or $T_2$, wherein the value of $R_2$ at about 2° C. below $T_1$ is at least twice the value of $R_1$ at $T_1$ or the value of $R_2$ at about 2° C. above $T_2$ is at least twice the value of $R_1$ at $T_2$. The rechargeable battery can have additional resistance levels, e.g., a third resistance level ($R_3$) associated with a third temperature ($T_3$) or over a third temperature range ($T_3$, $T_4$), and so forth. Advantageously, the value of $R_2$ at about 2° C. below $T_1$ is at least twice to fifty times the value of $R_1$ at $T_1$ and the value of $R_2$ at about 2° C. above $T_2$ is at least twice to fifty times the value of $R_1$ at $T_2$. The ohmic modulation of the battery is advantageously reversible, i.e., the internal resistance can switch back from $R_2$ to $R_1$ between $T_1$ and $T_2$.

In certain aspects of the present disclosure, a rechargeable battery includes terminals for operating the battery at $R_1$, e.g., a positive and a negative terminal for operating the battery at $R_1$, at least one high resistance terminal for operating the battery at $R_2$; and a switch that activates $R_2$ when the temperature of the battery is outside of either $T_1$ or $T_2$. The high resistance terminal can be electrically connected to at least one resistor sheet within a cell of the battery or between cells of the battery. Embodiments of such a battery include wherein the at least one resistor sheet is configured to have two tabs, with one tab electrically connected to other electrode tabs in the battery to form a low-resistance terminal, and the other tab of the at least one resistor sheet forming the at least one high-resistance terminal or wherein the at least one resistor sheet is the same as either or both of the two metal current collectors used in a battery cell, or a portion of the two metal current collectors.

For example, the rechargeable battery can include one or more resistor sheets embedded within stacks or jelly-rolls of electrode-separator sheets of a conventional battery and three terminals for operating the battery. The terminals allow operation of the battery at a low-resistance level $R_1$ or at a high-resistance level $R_2$. The three terminals can include either of one positive and two negative terminals or two positive terminals and one negative terminal. The former configuration is preferred. The two same-polarity terminals can further be connected by a switch that is self-activated thermally or driven by a temperature controller such that the battery switches between the terminals for operating the battery at $R_1$ and the terminals for operating the battery at $R_2$, when the battery temperature exceeds a critical value.

Another embodiment of the disclosure includes a rechargeable battery having one or more resistor sheets interposed between tabs of a battery cell, or subgroups of tabs of a battery, or tabs of multiple battery cells. This construction has the benefit that Joule heating generated on resistors is isolated from active materials and electrolytes of battery cells.

Another embodiment of the disclosure includes a rechargeable battery having one or more electrodes containing one or more positive temperature coefficient (PTC) materials. The PTC material can be included with the conducting agent mixed with electrode slurries, or a thin coating on the surface of active electrode materials, or an interfacial coating interposed between the active electrode materials and current-collecting foil, or a coating onto tabs before being connected together. The PTC materials of the present disclosure exhibit orders-of-magnitude resistance increases above certain temperatures, e.g., above about 80° C., thereby further enhancing battery safety. The nonlinear behavior of PTC materials advantageously causes a substantial increase in internal resistance above certain temperatures, which can be reversed upon lowering of the battery temperature.

Another embodiment of the disclosure includes a rechargeable battery having one or more electrodes containing one or more thermally expandable polymers as a binder in making electrodes, or a binder in making a conductive glue for the interface between active materials and current-collecting foil, or a pore filler for porous electrodes. These polymers expand dramatically upon heating, thereby creating large increase in electrical resistance when used as binders or large increase in ionic resistance when used as pore fillers (due to restricting pore volume and increasing pore tortuosity for ion transport). Both results in a dramatic increase in battery resistance as the battery temperature become sufficiently high.

Another aspect of the present disclosure includes a rechargeable battery having a multi-level profile of battery resistance with step changes at more than one threshold temperature. Such a profile can provide multiple layers of defense.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 3A illustrates the internal resistance vs. temperature relationship of an OMB as a bathtub profile and FIG. 3B illustrates the internal resistance vs. temperature relationship of an OMB as a step function. FIG. 3C is a chart showing the percent change in internal resistance over the change in temperature $$\left(\frac{dR}{R}\bigg/dT\right)$$

for the resistance levels and temperatures associated with OMB according to an embodiment of the present disclosure.

Figure 4:
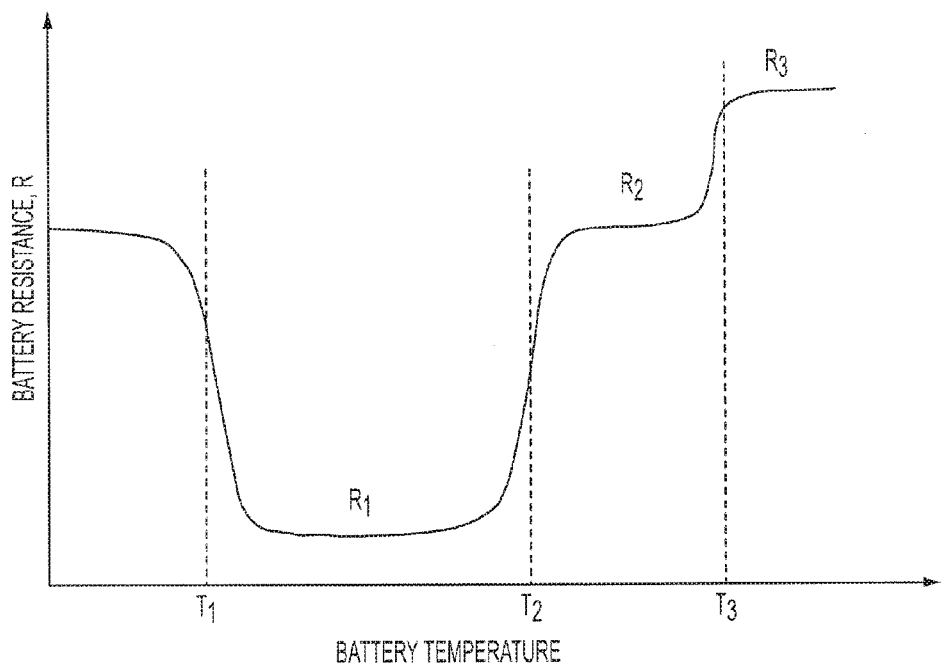

FIG. 4 shows the internal resistance vs. temperature relationship of an OMB according to an embodiment of the present disclosure where the battery resistance increases to another level $R_3$ around at a third temperature $T_3$.

Figure 5:
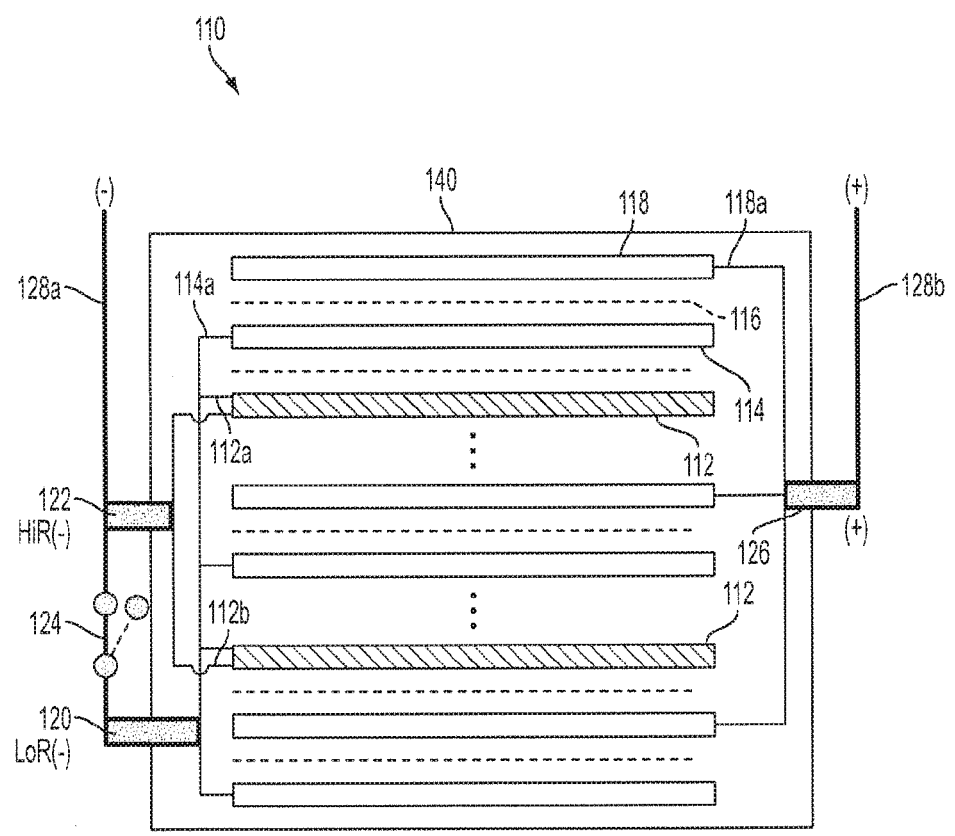

FIG. 5 is a schematic showing construction of an OMB having several resistor sheets/foils embedded within a stack of electrode-separator assemblies, one high-resistance negative terminal HiR(−) and one low-resistance negative terminal LoR(−), one positive terminal (+), and a thermally activated switch connecting the HiR(−) and LoR(−) terminals, according to an embodiment of the present disclosure.

Figure 6:
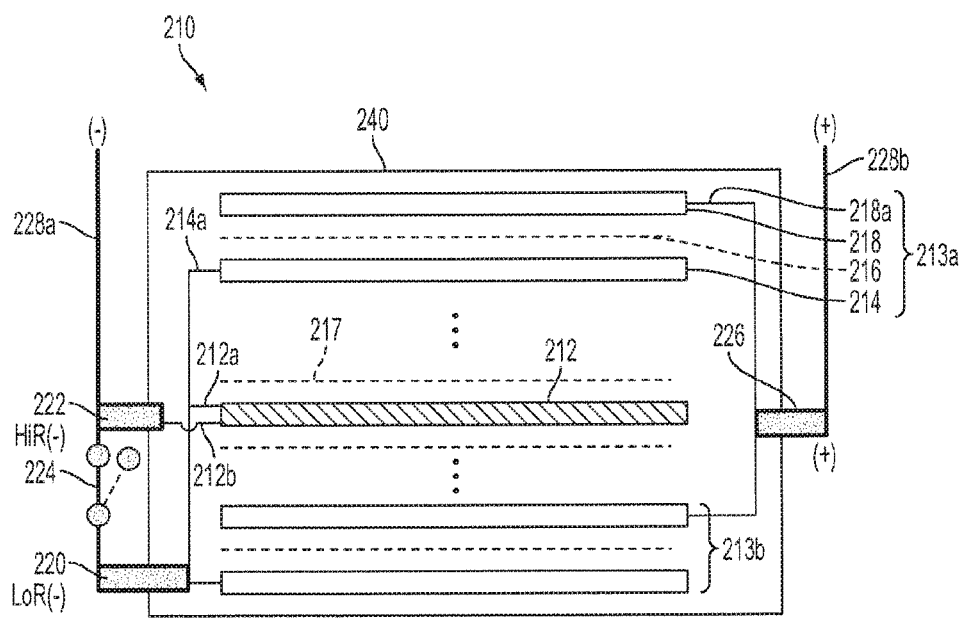
Figure 7A:
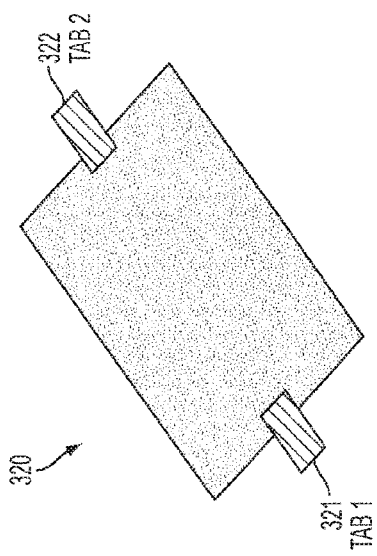
Figure 7B:
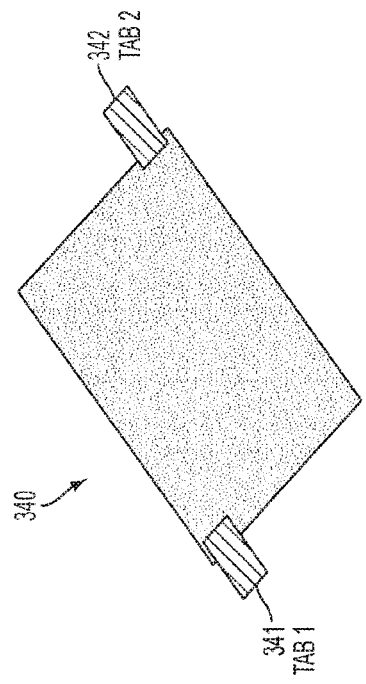
Figure 7C:
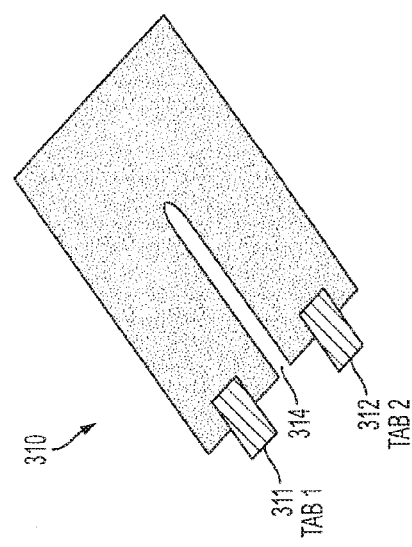
Figure 7D:
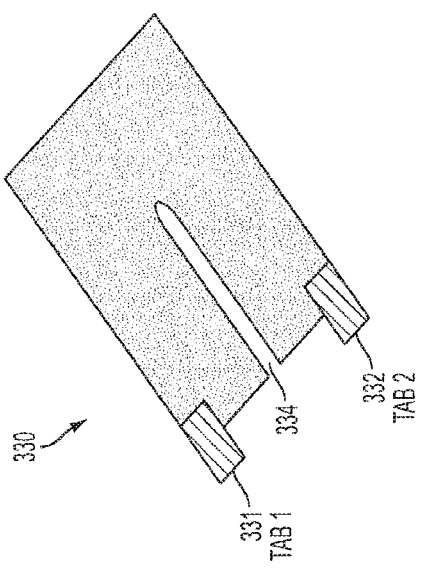

FIG. 6 illustrates another OMB composed of one resistor sheet embedded in the middle of a stack of electrode-separator assembly according to an embodiment of the present disclosure.

FIG. 7 shows four designs of resistor sheets with two tabs. One tab is electrically connected or welded to all tabs of negative electrode sheets to form LoR(−) terminal, and the other connected to the HiR(−) terminal. 7A: two tabs located on the same side of the sheet separated by a small cut in the middle to control the resistance path between the two tabs. 7B: two tabs are located on the opposite side. 7C: two tabs are located on the same side toward the outer edges. 7D: two tabs on the opposite side toward the outer edges.

Figure 8:
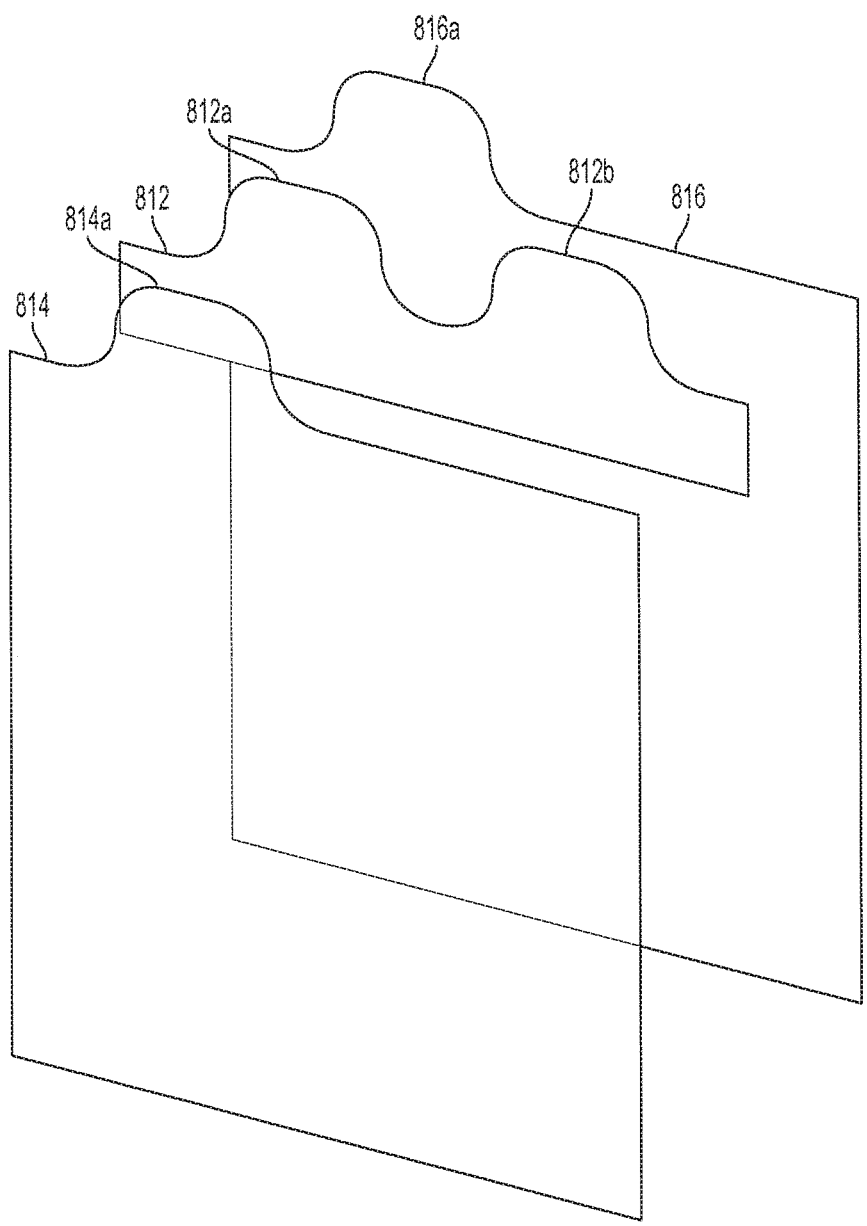

FIG. 8 illustrates a resistor sheet interposed between tabs of two electrodes of a battery cell according to an embodiment of the present disclosure.

Figure 9:
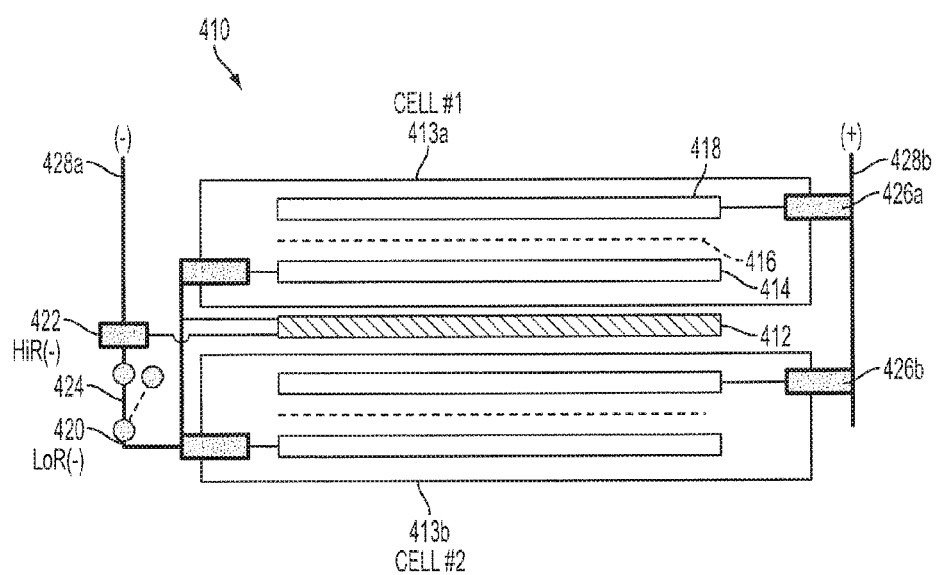

FIG. 9 shows construction of a twin-cell battery module with one resistor sheet/foil between the two cells, i.e. outside each cell casing without direct contact with battery electrolyte according to an embodiment of the present disclosure.

Figure 10:
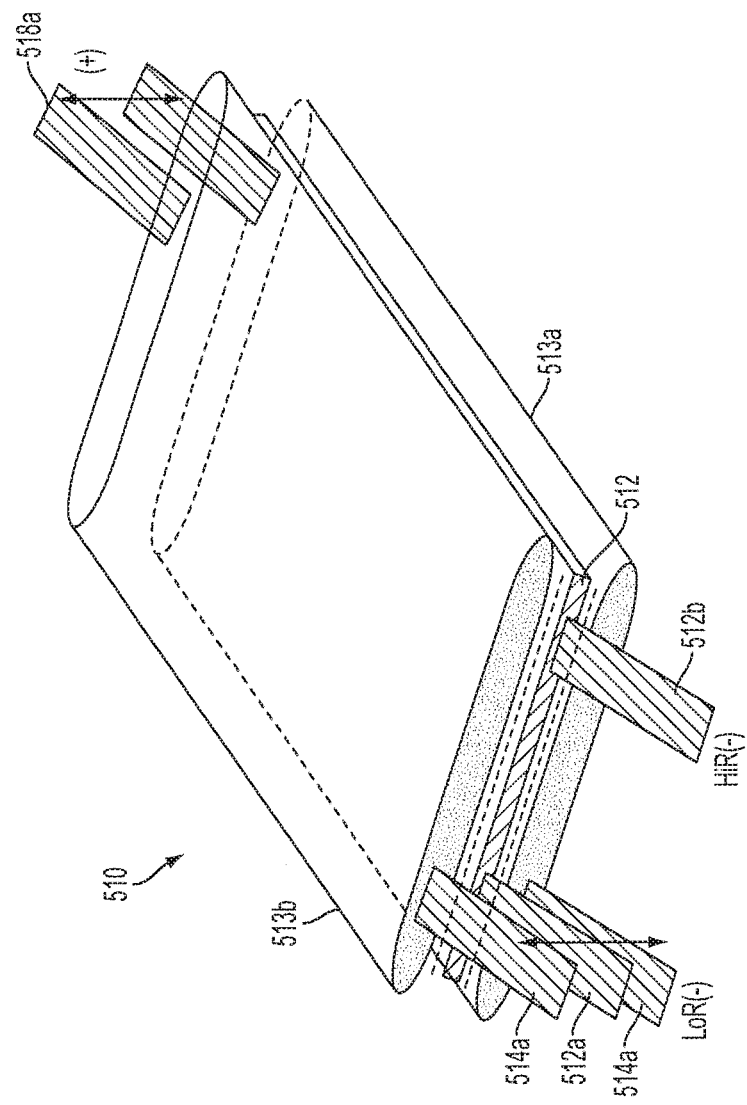

FIG. 10 illustrates a pair of jelly rolls sandwiching one resistor sheet/foil before inserting into a hard case or being packaged into a pouch cell, according to an embodiment of the present disclosure.

Figure 11:
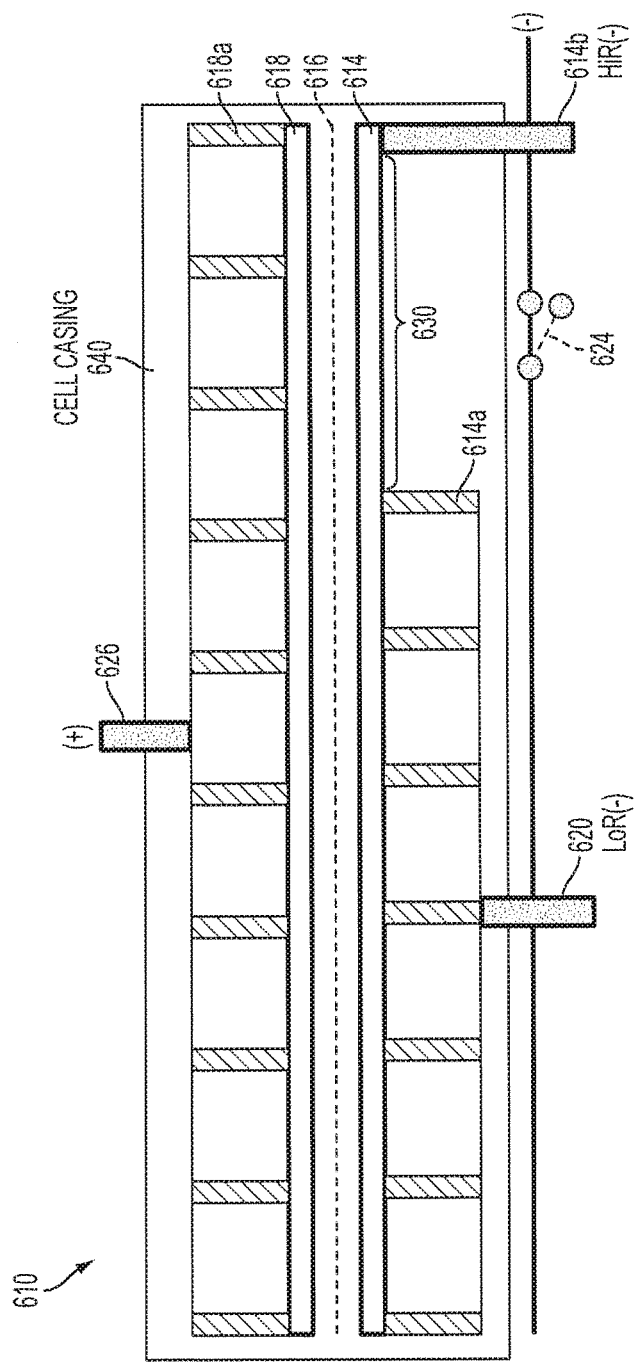

FIG. 11 is a schematic illustrating an unfolded jelly roll contained in a pouch cell wherein the positive electrode sheet has a number of closely spaced tabs welded together to form the positive terminal (+), and the negative electrode sheet has some closely spaced tabs welded together to form a low-resistance terminal LoR(−) as well as a far-away tab forming the high-resistance terminal HiR(−), according to an embodiment of the present disclosure. The LoR(−) terminal is connected with the HiR(−) terminal by a thermally activated switch.

Figure 12:
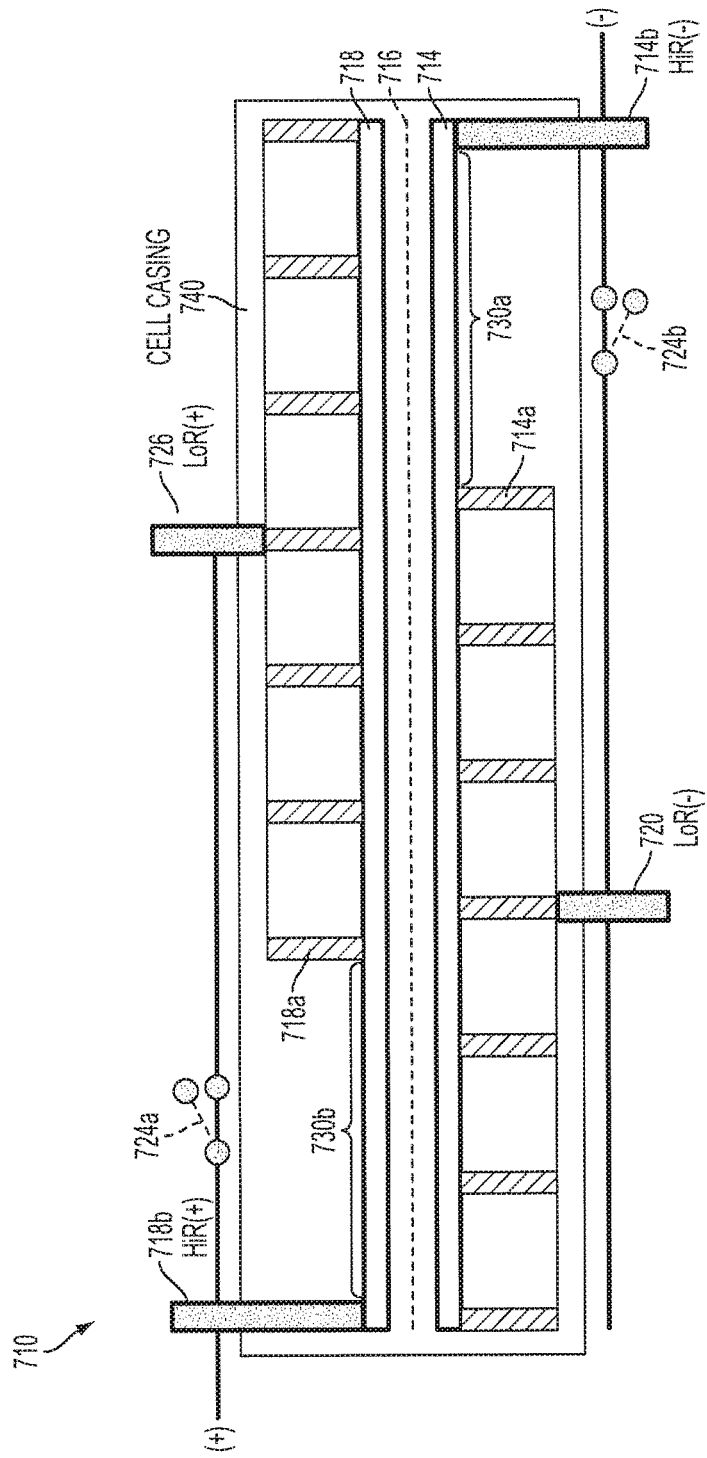

FIG. 12 illustrates a different design of an unfolded jelly roll with both the positive and negative electrode sheets featuring a number of closely spaced tabs and a far-away tab, respectively, according to an embodiment of the present disclosure. This design has four terminals outside the cell casing, i.e. two positive, LoR(+) and HiR(+), and two negative, LoR(−) and HiR(−). The two switches on both sides provide more than two levels of internal resistance according to the battery temperature and switching algorithms.

Figure 13:
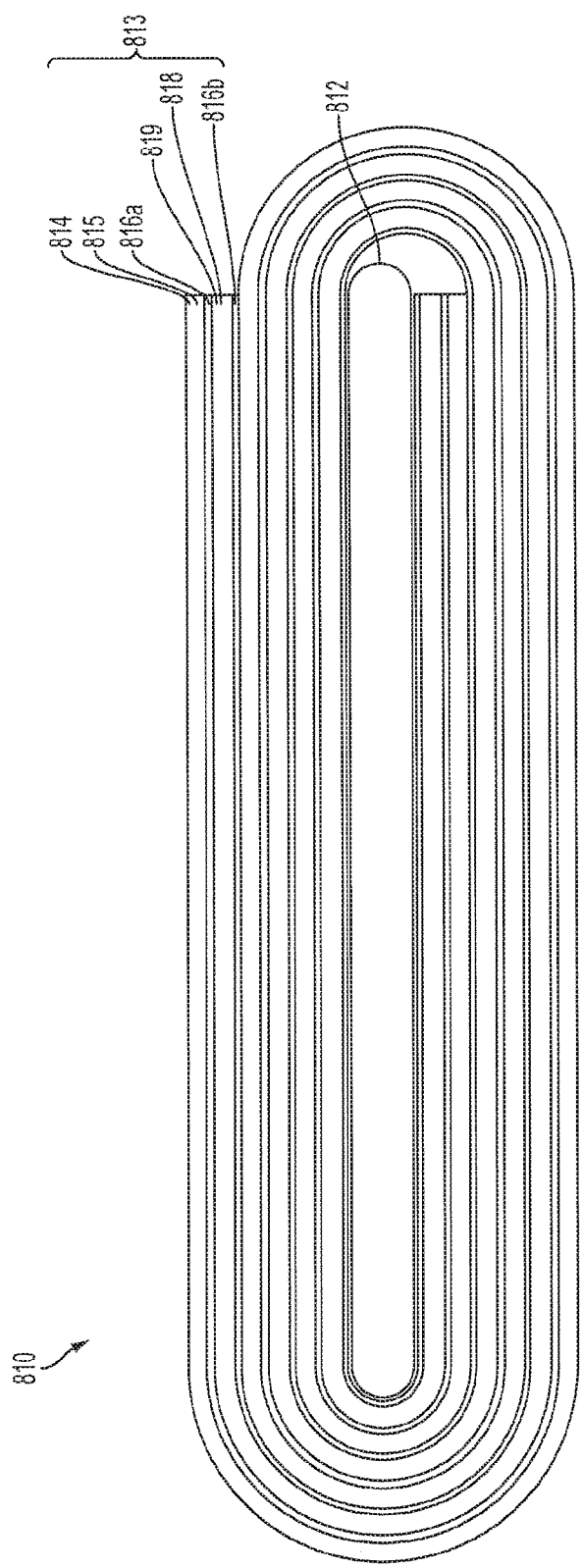
Figure 14:
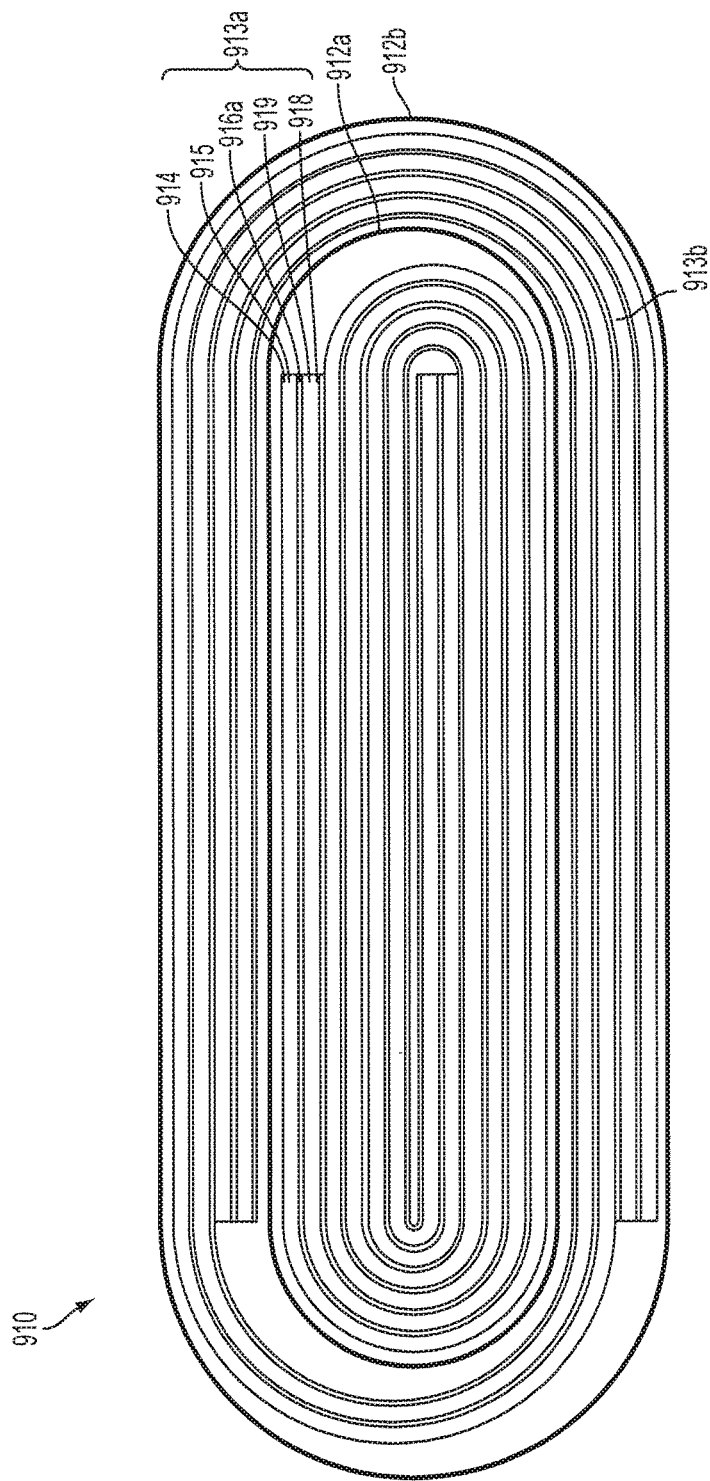
Figure 15:
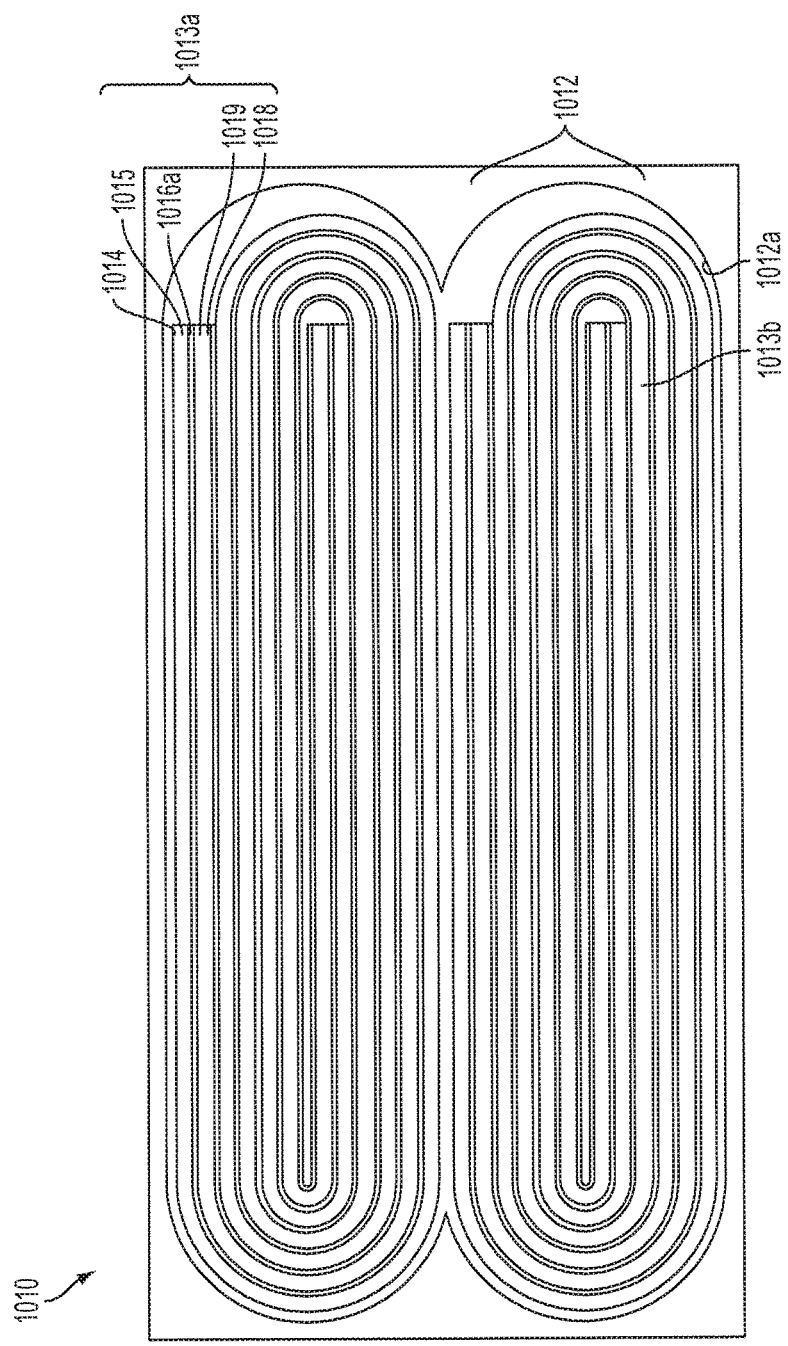

FIGS. 13, 14 and 15 illustrate flat jelly roll electrode assemblies having one or more resistor sheets according to the embodiment of the present disclosure.

Figure 16A:
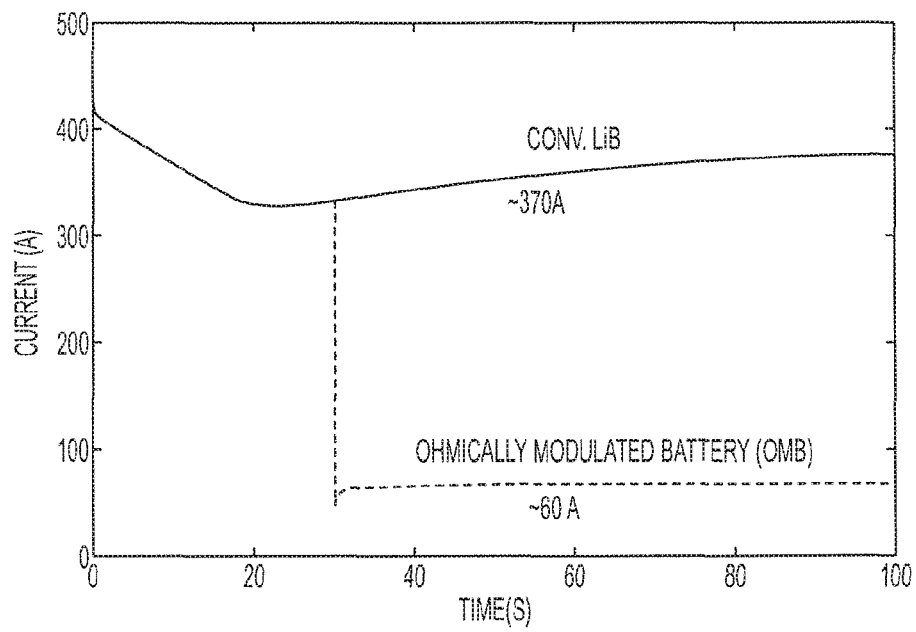
Figure 16B:
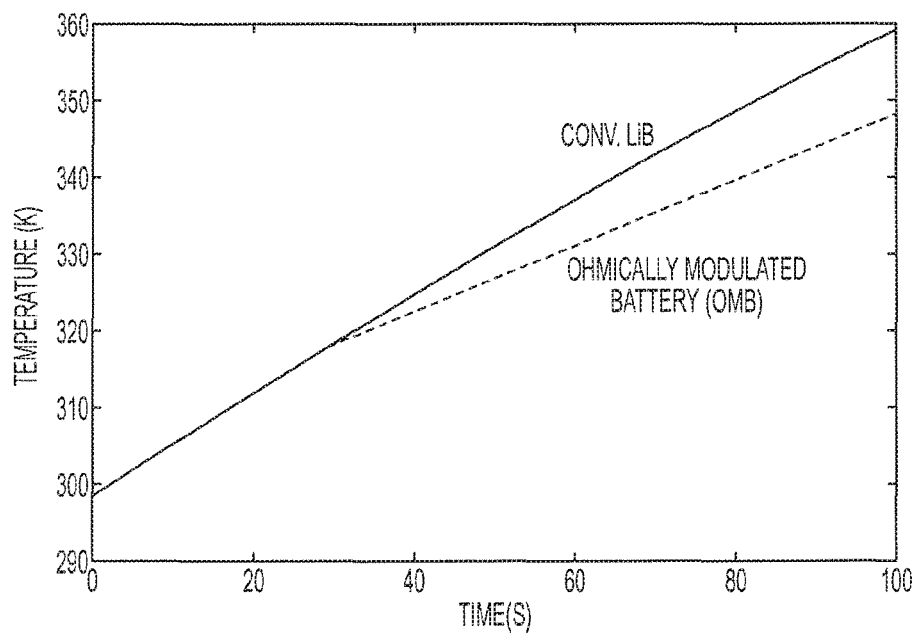

FIGS. 16A-16B compare electrical current and cell temperature responses in external shorting experiments of an OMB constructed according to an embodiment of the present disclosure with a conventional Li-ion battery (LiB). FIG. 16A compares the shorting current responses of the OMB with the conventional LiB. FIG. 16B compares the battery temperature responses of the OMB with the conventional LiB.

DETAILED DESCRIPTION OF THE DISCLOSURE

The present disclosure relates to a rechargeable battery that can modulate its internal resistance according to temperature. As used herein the terms ohmic modulation of a rechargeable battery or an ohmically modulated rechargeable battery refer to a rechargeable battery engineered to have more than one internal resistance levels that can change substantially with battery temperature.

Preferably, the rechargeable battery can comprise one level of internal resistance ($R_1$) over a temperature range of the battery between a first temperature ($T_1$) and a second temperature ($T_2$), and a second level of internal resistance ($R_2$) outside of either $T_1$ or $T_2$. Preferably the value of $R_2$ changes abruptly, such as in a step function, or changes sharply, such as in a continuous but rapid change in resistance, below around $T_1$ and/or at above around $T_2$. For example, the value of $R_2$ at about 2° C. below $T_1$ is at least twice the value of $R_1$ at $T_1$ or the value of $R_2$ at about 2° C. above $T_2$ is at least twice the value of $R_1$ at $T_2$. Advantageously, the value of $R_2$ at about 2° C. below $T_1$ is at least twice to fifty times the value of $R_1$ at $T_1$ and the value of $R_2$ at about 2° C. above $T_2$ is at least twice to fifty times the value of $R_1$ at $T_2$. The ohmic modulation of the battery is advantageously reversible, i.e., the internal resistance can switch back from $R_2$ to $R_1$ between $T_1$ and $T_2$.

In an embodiment an ohmically modulated rechargeable battery, the rate of the change in internal resistance over the change in temperature $$\left(\frac{dR}{R}\bigg/dT\right)$$

is greater than 10% per degree of Celsius in temperature, e.g. greater than 20%, 30%, 40%, or 50% per degree of Celsius in temperature, but less than 200,000% per degree of Celsius in temperature, e.g., less than 100,000%, 50,000% per degree of Celsius in temperature. In one aspect of the present disclosure, the rate of the change in internal resistance over the change in temperature $$\left(\frac{dR}{R}\bigg/dT\right)$$

is between about 50% but smaller than 5,000% per degree of Celsius in temperature. Conventional Li-ion batteries do not change internal resistance by more than a few percent for every degree of Celsius and cannot substantially change to another internal resistance level other than by a short circuit or separator shutdown, which results in a change rate of internal resistance likely much higher than 500,000%. Battery internal resistance R can be measured using standard DC or AC methods at discrete temperatures, and then the derivative dR/dT can be calculated from an R vs. T curve.

As used herein the terms rechargeable battery or battery are used to represent any rechargeable electrochemical energy storage device that contains one or more electrochemical cells. The basic elements of a battery cell include an anode electrode coated on a current collector, a separator, a cathode electrode coated on another current collector and an electrolyte.

The battery configuration of the present disclosure can be applied to a variety of batteries such as, but not limited to, lithium-ion, lithium-polymer, lead-acid, nickel-metal hydride, nickel-manganese-cobalt, lithium-sulfur, lithium-air and all solid-state batteries. Such batteries are useful for transportation, aerospace, military, and stationary energy storage applications.

In an embodiment of the present disclosure, a rechargeable battery can have at least two levels of internal resistance which depend on the battery's temperature. As used herein the temperature of the battery can be the internal temperature or external surface temperature of the battery. The rechargeable battery of the present embodiment can be configured to operate at a higher resistance level when the internal temperature of the battery is below an optimum temperature, e.g. below $T_1$, thereby heating the battery and improving battery performance. For example, when the battery's internal temperature is below a normal range, e.g. below normal operating temperatures such as below about 5° C. or in subfreezing environments (temperatures less than about 0° C., e.g., less than about –10 or –20° C.), the internal resistance of the battery becomes several-fold higher than when the battery operates in the normal temperature range (e.g. in the range of from about 40 $\Omega cm^2$ to about 200 $\Omega cm^2$). As a result, there is much intensified internal heating (as the battery's heat generation is proportional to its internal resistance), which leads to rapid rise of the battery's internal temperature. This in turn quickly improves power and energy output of the battery while operating in subfreezing environments.

The rechargeable battery of the present disclosure can also be configured to switch to a high internal resistance once the battery's internal temperature exceeds the high end of the normal operating range, e.g. above $T_2$. Temperatures that exceed the normal operating range depend upon several factors including the battery type. Such high end temperatures include, for example, above about 45° C., such as above about 50° C., 60° C., 70° C. and as high as about 130° C. Such higher internal temperatures can occur during abuse or a faulty event. The high internal resistance causes much enlarged cell voltage overshoot in the cell overcharge case, thus greatly facilitating early detection and shutdown of external charging systems before the cell enters a thermal runaway condition. In a short circuit case, for example, the higher internal resistance will release battery energy at a slower and controlled rate, thereby slowing down the rate of the cell temperature rise and protecting the cell from thermal runaway. This high internal resistance feature at the high end of the normal temperature range can facilitate the inherent safety of the battery.

Figure 1:
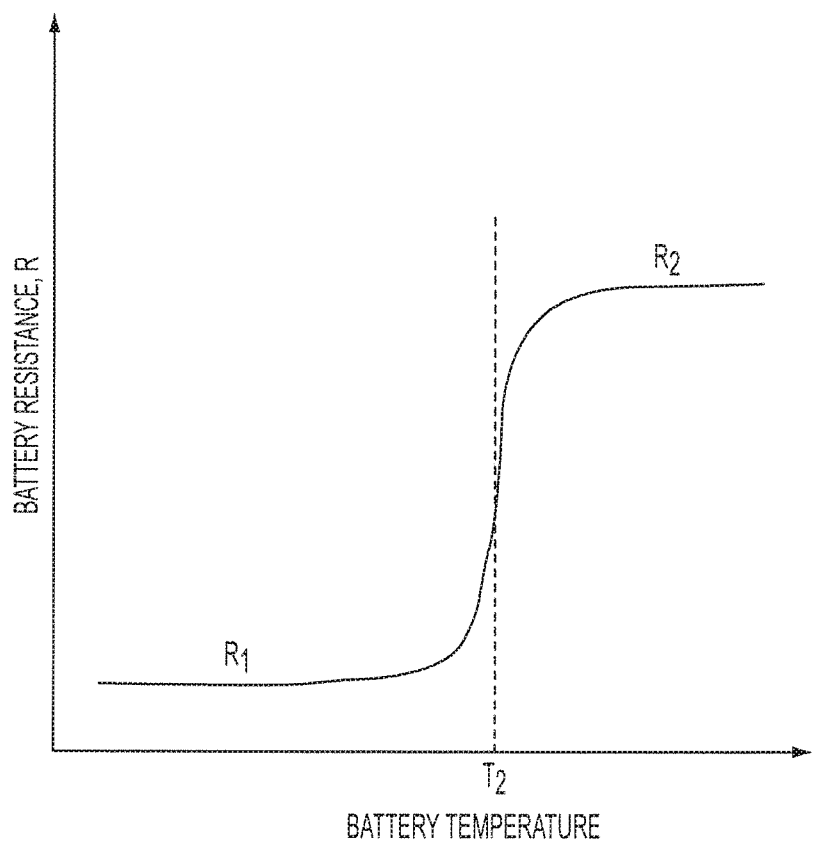
FIG. 1 shows a resistance characteristic of an ohmically modulated battery (OMB) according to an embodiment of the present disclosure where the battery resistance is modulated to have a sharp increase in internal resistance at a threshold temperature $T_2$ in order to minimize the potential for thermal runaway and to promote battery safety.
Figure 2A:
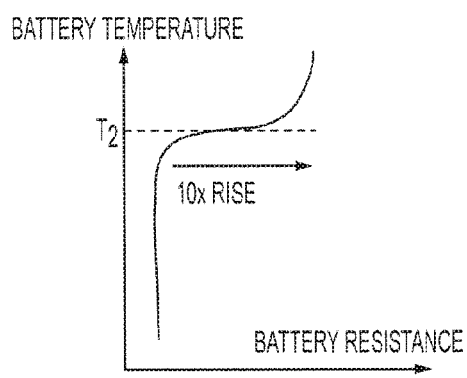
FIG. 2 is a schematic illustration of a step-by-step mechanism of an OMB with a 10-times jump in battery resistance at threshold temperature $T_2$ according to an embodiment of the present disclosure.
Figure 2D:
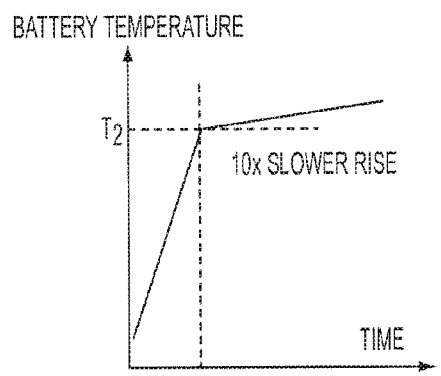
Figure 2B:
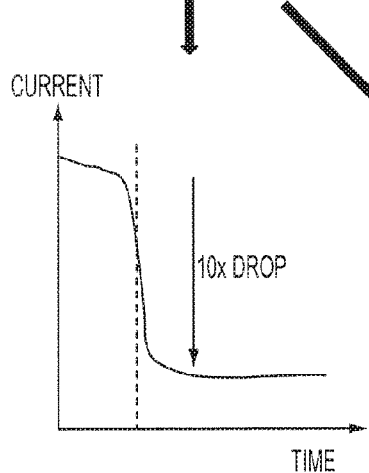
Figure 2C:
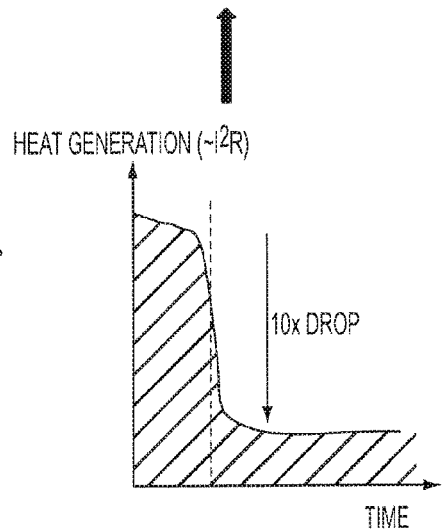

An advantage of the ohmically modulated battery of the present disclosure is that the internal resistance of the battery can jump sharply when the battery temperature reaches a threshold point $T_2$, as shown in FIG. 1. The resistance jump quickly suppresses the discharge/charge current and then significantly reduces the internal heat generation. This can be illustrated as shown in FIG. 2. As shown in the figure, with a 10-times jump in battery resistance at threshold temperature $T_2$ (FIG. 2a) leads to a significant drop in current (FIG. 2b) and heat generation (FIG. 2c) which in turn slows the rate of temperature rise (FIG. 2d). The increased battery resistance at $T_2$ reduces the rate of battery temperature rise, thereby minimizing or avoiding thermal runaway and promoting battery safety under any abuse conditions. $T_2$ is preferably set in at a temperature having a value within a range between about 45° C. and about 130° C., e.g. within a range between about 60° C. and about 100° C.

The ohmically modulated battery is not limited to having a resistance jump at the threshold temperature $T_2$ for high-temperature safety, it can also have a resistance increase occurring at a low temperature $T_1$ at or around subzero temperatures so as to generate internal heat and provide high power output when operated at subfreezing ambient temperatures. It is preferred for a single rechargeable battery to be configured to have a high internal resistance at both low and high temperatures, e.g., $R_2$ changes both below $T_1$ and above $T_2$. Such a rechargeable battery can then have both high power at low temperatures and high safety at high temperatures.

Figure 3A:
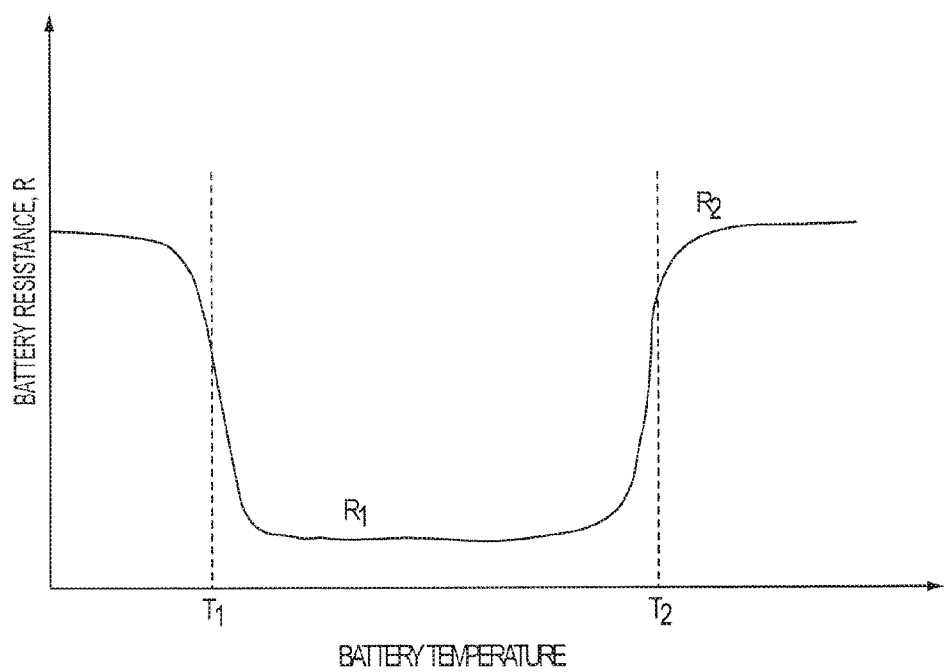
FIGS. 3A, 3B and 3C show graphs illustrating the relationship of internal resistance as a function of temperature of an ohmically modulated rechargeable battery according to embodiments of the present disclosure.
Figure 3B:
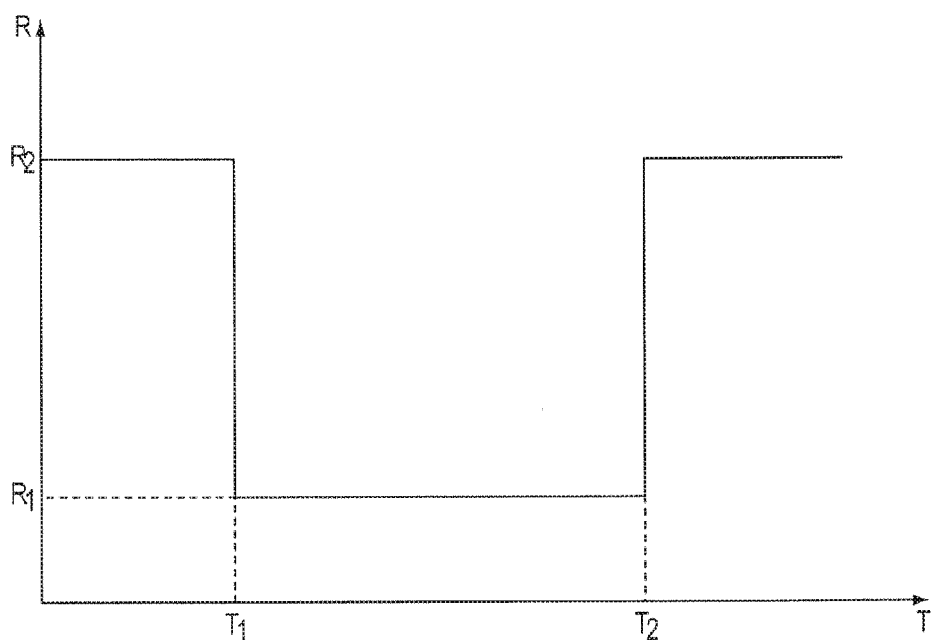

An example of an idealized resistance to temperature relationship of such a rechargeable battery having two resistance levels is schematically illustrated in FIGS. 3A and 3B. FIG. 3A illustrates the internal resistance vs. temperature relationship of an OMB as a bathtub profile and FIG. 3B illustrates the internal resistance vs. temperature relationship of an OMB as a step function. In these figures, the battery's internal resistance is modulated to a high level below a low temperature $T_1$ in order to rapidly warm up the battery and hence provide high power output at below operating temperatures and the battery's internal resistance is modulated to a high level above a high temperature $T_2$ to provide significantly improved safety at high temperatures.

As shown in the figures, during a normal operating temperature range, e.g., $T_1<T<T_2$, where $T_1$ is about 0° C. and $T_2$ is about 50° C., for example, the battery exhibits a low internal resistance ($R_1$) similar to the internal resistance experienced in a conventional rechargeable battery, e.g., such as a Li-ion battery. However, outside this operating temperature range, the internal resistance of the battery jumps to a higher level ($R_2$) where $R_2$ is preferably at least 2 to 5 times $R_1$, e.g., at least 10, 20 or as high as 50 times the value of $R_1$, when the value for $R_2$ is determined within about 2° C. of $T_1$ and/or $T_2$.

Figure 3C:
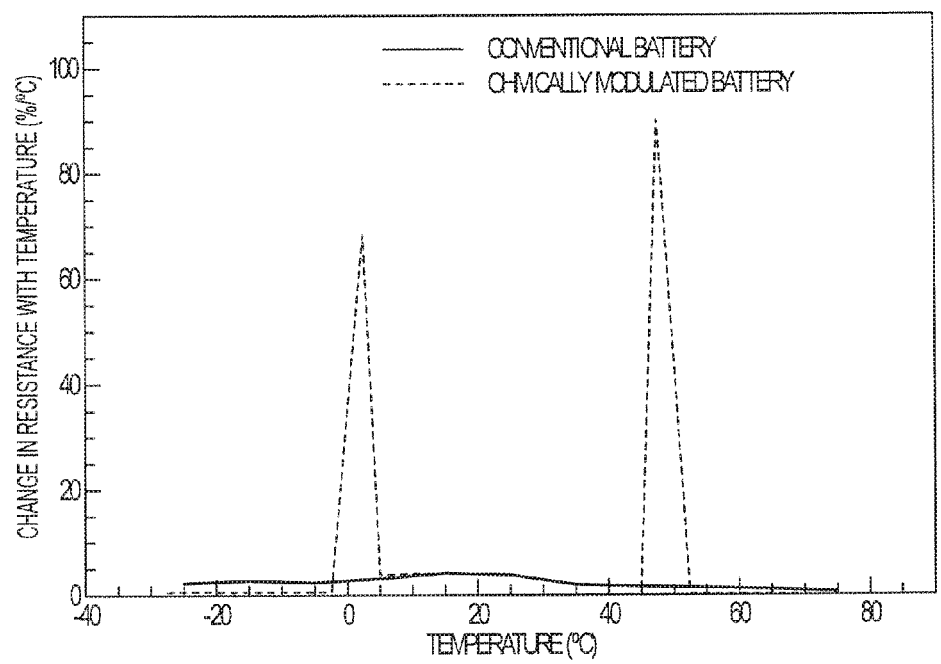

FIG. 3C is a chart showing the percent change in internal resistance over the change in temperature $$\left(\frac{dR}{R}\bigg/dT\right)$$

for the resistance levels and temperatures associated with OMB according to an embodiment of the present disclosure. In this figure, the percent change in internal resistance over the change in temperature $$\left(\frac{dR}{R}\bigg/dT\right)$$

is over 10% and 70% per ° C. Battery resistance R is measured by standard DC or AC methods at various discrete temperatures. Subsequently, dR/dT is calculated by taking the derivative of the R vs. T relationship.

In another aspect of the present disclosure, the OMB can include a third level of internal resistance ($R_3$) when the battery reaches a third temperature ($T_3$). Preferably, the value of $R_3$ changes abruptly or sharply above $T_3$, e.g. the value of $R_3$ at about 2° C. above $T_3$ is at least twice, e.g. at least 5, 10, 20 times or higher, the value of $R_2$ at $T_3$. In one aspect of the present disclosure, $T_3$ is a temperature having a value within a range between about 80° C. and about 130° C.

FIG. 4 illustrates a rechargeable battery having three resistance levels. As shown in the figure, the rechargeable battery has three internal resistance levels that are operated at different temperatures. After the battery temperature passes a higher threshold point $T_3$, the battery is operated at a third level of resistance $R_3$. Such a battery provides a double defense mechanism for the battery and improves the safety of the battery at elevated temperatures.

Advantageously, the rechargeable battery of the present disclosure can be readily configured with conventional rechargeable battery components with minimal modification in certain embodiments. In general terms, a conventional battery, such as a lithium-ion battery, includes sheets of one or more anode electrodes, separators and cathode electrodes either stacked up or wound in a jelly roll that are packaged in a pouch cover or hard case. Then the pouch or case is filled with an electrolyte. The cathode active materials can include lithium cobalt oxide, lithium iron phosphate, lithium manganese oxide, lithium nickel-cobalt-manganese oxides, lithium-rich layered oxides, or their mixtures. Anode active materials can include graphite, silicon, silicon alloys, lithium metal, lithium alloys such as lithium titanate, their mixtures, etc.

For example, a conventional lithium-ion battery includes a positive electrode, a negative electrode, a separator, a positive electrode current collector, a negative electrode current collector, an electrolyte and a battery cover or can. The positive electrode coated on one current collecting foil (e.g. Al foil) and the negative electrode coated on another current collecting foil (e.g. Cu foil) are stacked or wound with a separator interposed in-between, and an electrolyte solution in which an electrolyte is dissolved in a solvent is impregnated in the separator and the two porous electrodes.

Both positive and negative electrodes include afore-described active materials, binders and conducting agents if necessary. Common binders include PVDF (Polyvinylidene fluoride) and styrene-butadiene rubber (SBR) and sodium salt of carboxymethyl cellulose (CMC). Conducting agents are usually carbon-based and mixed with the active materials to increase the electrode conductivity.

Lithium salts such as $LiPF_6$, $LiBF_4$, etc. can be used singly or in combination as the electrolyte. Chained carbonate, annular carbonate, annular ester, nitrile compounds and the like can be used as the solvent used to dissolve the lithium salts. Specific examples thereof include ethylene carbonate (EC), ethyl methyl carbonate (EMC), dimethyl carbonate (DMC), propylene carbonate (PC), diethyl carbonate, dimethoxyethane, etc. In addition, a polymer-gel electrolyte or a solid electrolyte can be used as the electrolyte.

A rechargeable battery of the present disclosure can include the conventional components of a rechargeable battery and additionally include one or more components to modulate the internal resistance of the battery.

For example, an ohmically modulated rechargeable battery of the present disclosure can include at least one negative terminal and at least one positive terminal for operating the battery at $R_1$, e.g. at a low internal resistance level (LoR), between $T_1$ and $T_2$ and at least one high resistance terminal for operating the battery at $R_2$, e.g. at a high internal resistance level (HiR), when the battery temperature is outside of either $T_1$ or $T_2$. The high resistance terminal can either be an additional negative terminal (i.e., a HiR (−)) or an additional positive terminal (i.e., a HiR(+)).

Such a rechargeable battery can include a switch that switches the resistance levels of the battery. For example the switch can engage the low resistance terminals of the battery, e.g., LoR (−) and/or LoR (+), to operate the battery when the temperature of the battery is between $T_1$ and $T_2$, and can engage one or more high resistance terminal, e.g., HiR(−) and/or HiR(+), when the battery temperature is outside of either $T_1$ or $T_2$.

The switch of the present disclosure can include those activated by thermally sensitive devices such as a glycol-water liquid capsule that expands upon freezing and pushes the switch open, a phase-change material that undergoes phase transition and appreciable volume change at $T_1$ or $T_2$ or both, or a bimetal switch, or a solid material whose volume expands appreciably at temperature $T_1$ or $T_2$ or both, for example.

The switch of the present disclosure can be composed of an electromechanical relay and a temperature controller, or a solid-state relay with a temperature sensor, a power MOSFET with a temperature sensor, or a high-current switch with a temperature sensor. Alternatively, the switch connecting LoR(−) and HiR(−) terminals can be carried out by a controller having an electric circuit and a cell temperature sensor in a battery management system.

In an embodiment of the present disclosure, the rechargeable battery includes at least one resistor sheet that is electrically connected to the high resistance terminal. The at least one resistor sheet can be located either inside a battery cell (exposed to the electrolyte), or outside and between two battery cells, or a combination of some resistor sheets inside cells and some resistor sheets outside and between cells. In addition, the resistor sheet configured with a cell of the battery can be integrally part of the current collector of an electrode of the cell of the battery.

As used herein, a resistor sheet is a material that has a similar or lower electrical conductivity relative to an unmodified current-collecting foil of a battery's electrode but causes a significant increase in the internal electrical resistance of the battery when activated during battery operation. The resistor sheet preferably has a resistance in units of Ohm equal to the numerical value of between 0.1 to 5 divided by the battery's capacity in Amp-hours (Ah), e.g. between about 0.5 to 2 divided by the battery's capacity in Ah. For example the resistor sheet for a 20 Ah battery is preferably between about 0.005 Ohm (0.1 divided by 20) to about 0.25 Ohm (5 divided by 20), e.g. between about 0.025 Ohm (0.5 divided by 20) to about 0.1 Ohm (2 divided by 20).

The resistor sheets of the present disclosure can be any sufficiently conductive material that is stable when exposed to battery electrolytes and within the electrochemical voltage window of a rechargeable battery when the resistor sheet is exposed to such an environment. Such resistor sheets can be made of, for example, graphite, highly ordered pyrolytic graphite (HOPG), stainless steel, nickel, chrome, nichrome, copper, aluminum, titanium, or combinations thereof. If used outside of battery cells and between two adjacent cells in a module, the resistor sheets do not need to be anti-corrosive and thus additional materials are available for use as resistor sheets of the present disclosure. In certain embodiments, the resistor sheet of the present disclosure is preferably flat with a large surface area so that it can have good contact with adjacent battery components. The resistor sheets of the present disclosure can have a thickness between about 1 micrometer and about 150 micrometers with a preferred range of about 5 to about 60 micrometers. Resistor sheets that have large electrical resistance, high thermal conductivity, and small heat capacity are useful for certain embodiments of the present disclosure.

In certain configurations of the present disclosure, the rechargeable battery includes one or more high resistance tabs or terminals and one or more low resistance tabs or terminals. The high resistance terminals electrically connect the one or more resistance sheets and the low resistance tabs or terminals are configured to operate the battery in a low internal resistance mode.

FIGS. 5 and 6 illustrate additional embodiments of the present disclosure. As shown in FIG. 5, rechargeable battery 110 has several resistor sheets 112 embedded within a stack of electrode-separator assemblies. The electrode-separator assemblies include anode electrodes 114 having anode tabs 114a, separators 116 and cathode electrodes 118 having cathode tabs 118a. Battery 110 further includes one low-resistance negative terminal LoR(−) 120 and one high-resistance negative terminal HiR(−) 122, switch 124 and positive terminal (+) 126.

In this embodiment, each resistor sheet has two tabs (112a, 112b), which can be attached by welding. Resistor tab 112a and anode tabs 114a of anode electrodes 114 are electrically connected to low-resistance negative terminal LoR(−) 120 to form a low electrical resistance circuit. Resistor tab 112b is electrically connected to high-resistance negative terminal HiR(−) 122 to form a high electrical resistance level circuit that is activated by switch 124. Cathode tabs 118a of cathode electrodes 118 are electrically connected together and to positive terminal 126. In this particular example, switch 124 is a thermally activated switch that can electrically connect or disconnect LoR(−) terminal 120 and HiR(−) terminal 122.

The anode-separator-cathode-resistor sheet assembly can be place in an appropriate package, e.g., in a casing of a pouch cell and filled with electrolyte. In this embodiment, the anode-separator-cathode-resistor sheet assembly is contained in casing 140. The negative and positive terminals can be electrically connected to an external circuit 128a and 128b.

In sum, the rechargeable battery illustrated in FIG. 5 features three terminals on the outside of casing 140, two negative terminals, LoR(−) and HiR(−), and one positive terminal (+). The two negative terminals, LoR(−) and HiR (−), are further connected by a temperature-sensitive switch immediately outside of the battery. In operation, when the battery temperature is within a normal operating range, defined as between a first temperature $T_1$ and a second temperature $T_2$, the switch is CLOSED and the battery current bypasses the resistor sheets since current prefers to flow through the low-resistance circuit. In this case, the battery operates between the terminals (+) and LoR(−), exhibiting a low internal resistance. When the battery temperature goes outside the normal range of $T_1$ and $T_2$, the switch is made OPEN, leaving the terminals (+) and HiR(−) operative. This forces the battery current to flow through the resistor sheets and hence exhibits high internal resistance. For example, when the battery temperature is above a normal range, such as above about 45° C., the internal resistance of the battery becomes several-fold higher due to the presence of the resistor sheets in the current flow path.

FIG. 6 shows another configuration of a rechargeable battery having at least one resistor sheets inserted between a stack of the electrode-separator assemblies for increasing the internal resistance of the battery. In this embodiment, rechargeable battery 210 includes resistor sheet 212 positioned between two electrode-separator assemblies 213a and 213b. The resistor sheet is preferably positioned in the middle of the stack of electrodes and can be sandwiched by separators 217 that can be the same or different than separators 216. Each electrode-separator assembly includes anode electrodes 214, separators 216 and cathode electrodes 218. Battery 210 further includes one low-resistance negative terminal LoR(−) 220, one high-resistance negative terminal HiR(−) 222, switch 224 and positive terminal (+) 226.

In this embodiment, resistor sheet 212 has two tabs (212a, 212b), which can be attached by welding. Resistor tab 212a and anode tabs 214a of anode electrodes 214 are electrically connected to low-resistance negative terminal LoR(−) 220 to form a low electrical resistance circuit. Resistor tab 212b is electrically connected to high-resistance negative terminal HiR(−) 222 to form a high electrical resistance level circuit that is activated by switch 224. Cathode tabs 218a of cathode electrodes 218 are electrically connected together and to positive terminal 226. In this particular example, switch 224 is a thermally activated switch that can electrically connect or disconnect LoR(−) terminal 220 and HiR(−) terminal 222.

The anode-separator-cathode-resistor sheet assembly can be placed in an appropriate package, e.g., in a casing of a pouch cell and filled with electrolyte. In this embodiment, the anode-separator-cathode-resistor sheet assembly is contained in casing 240. The negative and positive terminals can be electrically connected to an external circuit 228a and 228b. The rechargeable battery 210 of FIG. 6 can be operated in the same manner as described for FIG. 5.

FIG. 7 illustrates different resistor sheet configurations that can be used in the rechargeable batteries of the present disclosure, including in the configurations shown in FIGS. 5 and 6. Each resistor sheet, 310, 320, 330, 340, has two tabs, which can be attached by welding. The tabs on the various resistor sheets can be positioned in various configurations, as shown in FIG. 7. These configurations include (a) 2 tabs on the same side (311, 312), separated by cut 314; (b) 2 tabs on the opposite side of the resistor sheet and located at approximately in the middle of the edge (321, 322) and separated by cut 334; (c) 2 tabs on the same side but on the outer edges of the resistor sheet (331, 332); and (d) 2 tabs on the opposite side of the resistor sheet but on outer edges (341, 342). In one embodiment of the present disclosure, one or more of the resistor sheets shown in FIG. 7 can be used in the configurations of FIG. 5 or 6. For example, for any resistor sheet in FIG. 7, the tabs labeled as Tab 1 can be connected (e.g. welded) with all tabs of the anode electrode sheets in the battery. Together, they form the low-resistance terminal LoR(−) in FIG. 5 or FIG. 6. Tabs 2 as shown in FIG. 7 can be welded together to form the high-resistance terminal HiR(−) in either FIG. 5 or FIG. 6.

Another embodiment of the present disclosure includes a rechargeable battery having one or more resistor sheets interposed between tabs of a battery cell, or subgroups of tabs of a battery, or tabs of multiple battery cells. The design in this embodiment can be used with any conventional rechargeable battery. FIG. 8 illustrates an embodiment of a rechargeable battery having a resistor sheet interposed between tabs of electrodes in a battery cell. This figure shows resistor sheet 812 interposed between tabs 814a and 816a of two electrodes, 814 and 816. Resistor sheet tab 812a is electrically connected to tabs 814a and 816a of electrodes 814 and 816, e.g., anode electrodes of a cell and to a low-resistance negative terminal LoR(−) (not shown) to form a low electrical resistance circuit. Tab 812b of the resistor sheet 812 is electrically connected to high-resistance negative terminal HiR(−) (not shown) to form a high electrical resistance level circuit. The rechargeable battery in this embodiment would also include a switch that can electrically connect or disconnect the LoR(−) terminal and the HiR(−) terminal and the battery with this configuration can be operated in the same manner as described for FIG. 5.

While the battery configuration in FIG. 8 is illustrated with one resistor sheet interposed between two electrodes, additional resistor sheets can be interposed between additional electrodes to form a high resistance internal level of the battery. The use of one or more resistor sheets interposed between tabs of a battery cell has the benefit that Joule heating generated upon activation of the resistor sheet is isolated from the active materials of the electrode and the electrolyte of battery cells, thereby further enhancing battery safety. In one embodiment of the present disclosure, one or more of a resistor sheet shown in FIG. 8 can be used in the configurations of FIG. 5 or 6.

In other embodiments of the present disclosure, a rechargeable battery can be configured by placing one or more resistor sheets outside a cell of the battery. For example, with a battery module including multiple cells the one or more resistor sheets can be sandwiched between two adjacent cells within the battery module. FIG. 9 illustrates such an embodiment.

As shown in FIG. 9, battery module 410 includes resistor sheet 412 positioned between two cells 413a and 413b. The resistor sheet is preferably positioned between the cells of the battery module, such as interposed tightly between two cells. Each cell includes anode electrodes 414, separators 416 and cathode electrodes 418. Battery module 410 further includes one low-resistance negative terminal LoR(−) 420 which is electrically connected to each cell of the module and one high-resistance negative terminal HiR(−) 422, which is electrically connected to the resistor sheet. The battery module also includes switch 424 and positive terminals (+) 426a and 426b. The negative and positive terminals can be electrically connected to an external circuit 428a and 428b. The rechargeable battery module 410 of FIG. 9 can be operated in the same manner as described for FIG. 5.

While battery module 410 in FIG. 9 is illustrated as a twin-cell module with one resistor sheet between the two cells, battery modules of the present disclosure can have more than two cells and/or more than one resistor sheets positioned in the middle of the cell modules. For example, the battery module can have 4, 5 or 6 cells with one or more resistor sheets positioned between cells and around other positions near the cells.

In one embodiment of the present disclosure, one or more of the resistor sheets shown in FIG. 7 and/or FIG. 8 can be used in the configurations of FIG. 9. For example, for any resistor sheet in FIG. 7, the tabs labeled as Tab 1 can be connected to the negative terminals of the cells, forming a low-resistance terminal for the battery module, LoR(−). Tab 2 of any of the resistor sheets shown in FIG. 7 can be welded together to form the high resistance terminal of the battery module, HiR(−). The activation and operation of such a battery module is the same as for a single cell described earlier.

In another embodiment of the present disclosure, one or more resistor sheets can be sandwiched between two jelly rolls of electrode-separator assembly of a rechargeable battery. FIG. 10 illustrates such an embodiment. As shown in FIG. 10, resistor sheet 512 is sandwiched between two jelly rolls (513a, 513b). The design in this embodiment can be used with any conventional rechargeable battery containing jelly roll electrode assemblies. As further shown in FIG. 10, the electrically resistor sheet 512 has two tabs (512a, 512b), which can be attached by welding. Resistor tab 512a is electrically connected to anode tabs 514a of anode electrodes of the jelly roll (not shown for illustrative convenience) and to a low-resistance negative terminal LoR(−) (not shown) to form a low electrical resistance circuit. Resistor tab 512b is electrically connected to high-resistance negative terminal HiR(−) (not shown) to form a high electrical resistance level circuit. Cathode tabs 518a of cathode electrodes of the jelly roll are electrically connected together and to a positive terminal (not shown for illustrative convenience). The rechargeable battery in this embodiment would also include a switch outside of the battery that can electrically connect or disconnect the LoR(−) terminal and the HiR(−) terminal. The rechargeable battery 510 of FIG. 10 can be operated in the same manner as described for FIG. 5.

While the battery configuration in FIG. 10 is illustrated as two jelly rolls with one resistor sheet therebetween, rechargeable batteries of the present disclosure can have more than two jelly rolls and/or more than one resistor sheet positioned in the middle of the jelly roll. For example, the battery can have three or more jelly rolls with one or more resistor sheets positioned between a pair of jelly rolls and/or around other positions near each or some of the jelly rolls.

In one embodiment of the present disclosure, one or more of the resistor sheets shown in FIG. 7 and/or FIG. 8 can be used in the configurations of FIG. 10. For example, for any resistor sheet in FIG. 7, the tabs labeled as Tab 1 can be connected to the negative terminals of the cells, forming a low-resistance terminal for the battery, LoR(−). Tab 2 of any of the resistor sheets shown in FIG. 7 can be welded together to form the high resistance terminal of the battery, HiR(−). The activation and operation of such a battery is the same as described for the battery of FIG. 5.

In an embodiment of the present disclosure, a rechargeable battery can be constructed without using a separate resistor sheet to produce the high electrical internal resistance level of the battery. For example, a high electrical resistance circuit can be configured to be integrally part of the current collector of an electrode of the cell of the battery. In one embodiment of the present disclosure, a rechargeable battery includes at least one negative terminal and at least one positive terminal for operating the battery at $R_1$ over $T_1$ and $T_2$; at least one high resistance terminal (e.g., an additional negative or positive terminal) for operating the battery at $R_2$ outside of either $T_1$ or $T_2$; and a switch that activates $R_2$ when the temperature of the battery is outside of either $T_1$ or $T_2$, wherein the at least one high resistance terminal is electrically connected to at least one resistor sheet within a cell of the battery and wherein the at least one resistor sheet is integrally part of the current collector of an electrode of the cell of the battery. FIG. 11 illustrates such an embodiment.

FIG. 11 shows an assembly including anode electrode 614, separator 616 and cathode electrode 618. This assembly is applicable to a wide variety of rechargeable battery configurations, such as a jelly roll design in cell casing. In this embodiment, cathode (positive) electrode 618 includes a number of closely spaced tabs 618a electrically connected (e.g., welded together) to form Terminal (+) 626. On the other hand, anode (negative) electrode 614 includes a few closely spaced tabs (614a) electrically connected together to form terminal LoR(−) 620 and tab 614b that is at a distance from the closest tab 614a. Tab 614b can be electrically connected to a high electrical resistance terminal. In this example, Tab 614b forms the high electrical resistance terminal HiR(−).

In this design, the portion of the negative electrode foil, i.e. Cu foil, between tab 614b (the far-away tab) and the closest of the closely spaced tab (tab 614a), acts as a large resistance to be operative when the battery temperature is below the normal range, i.e. below $T_1$. In other words, the material between tabs 614a and 614b (designated 630) acts as the resistor sheet for this battery design. On the outside of the cell casing, the terminals LoR(−) and HiR(−) can be electrically connected and disconnected via switch 624, e.g., a temperature-sensitive switch. Activation and operation of a battery with the configuration illustrated in FIG. 11 can be done in the same manner as described for the battery in FIG. 5.

The electrical resistance of 630 will depend on, among other things, the distance between tab 614b and the closest tab 614a, on the material used to form the current collector, e.g., the composition of the foil, and any material on the foil between the two tabs and the desired resistance level of the high resistance terminal. Electrodes of a rechargeable battery are typically formed by coating one or more electrochemically active materials, with or without a binder and/or conductive diluent, onto a current collector. Such materials can also affect the electrical resistance of 630.

FIG. 12 illustrates another embodiment of a rechargeable battery of the present disclosure including a resistor sheet that is integrally part of the current collector of an electrode of the cell of the battery. In this embodiment, an assembly including anode electrode 714, separator 716 and cathode electrode 718 are shown. As explained for the configuration of FIG. 10, the assembly shown in FIG. 12 is applicable to a wide variety of rechargeable battery configurations. In this example, both cathode and anode electrodes have a number of closely spaced tabs electrically connected to form Terminals LoR(+) and LoR(−) as well as far-away tabs to form HiR(+) and HiR(−). In particular, cathode (positive) electrode 718 includes a number of closely spaced tabs 718a electrically connected to form Terminal (+) 726 and tab 718b that is at a distance from the closest tab 718a to form the high electrical resistance terminal HiR(+). Anode (negative) electrode 714 includes a few closely spaced tabs (714a) electrically connected together to form terminal LoR(−) 720 and tab 714b that is at a distance from the closest tab 714a to form the high electrical resistance terminal HiR(−)

In this design, the portions of the negative electrode foil (i.e. Cu) and positive electrode foil (i.e. Al) between the closely spaced tab group and far-away tab act as a large resistance to be operative when the battery temperature is below the normal range, i.e. below $T_1$. In other words, the material between tabs 714a and 714b (designated 730a) and the material between tabs 718a and 718b (designated 730b) act as resistor sheets for this battery design.

On the outside of cell casing 740, two independent switches (724a, 724b) can be used to connect the terminal LoR(+) with HiR(+) and LoR(−) with HiR(−), respectively. The two switches can operate simultaneously, or independently from each other, or according to an algorithm as a function of battery temperature. Otherwise, activation and operation of a battery with the configuration illustrated in FIG. 12 can be done in the same manner as described for the battery in FIG. 5.

Many more tab designs for the jelly roll configuration of a rechargeable battery are possible as long as one group of tabs provides a low resistance and the other group of tabs provides a high resistance.

In another embodiment of the present disclosure, one or more resistor sheets can be included with a rolled electrode assembly of a rechargeable battery. FIGS. 13, 14 and 15 illustrate embodiments of a jelly rolled electrode assembly having one or more resistor sheets. As shown in FIG. 13, resistor sheet 812 is included within about the center of the jelly roll assembly. In this embodiment, the resistor does not directly contact any electrode and should not adversely affect the capacity of the cell. The resistor sheet can be inserted after the jelly roll is assembled or while assembling the jelly roll. The resistor sheet can also advantageously act as a structural support for the jelly roll assembly. The design in this embodiment can be used with any conventional rechargeable battery containing jelly roll electrode assemblies. As further shown in FIG. 13, the jelly roll assembly 813 further includes anode electrode 814 on current collector 815, e.g., a copper foil, first separator 816a, cathode electrode 818 on current collector 819, e.g. an aluminum foil, and second separator 816b. In addition to having a resistor sheet in more or less the center of the jelly roll assembly, a resistor sheet can be included on the outermost layer of the jelly roll. The jelly roll can be flat in shape, as shown in FIG. 13, or cylindrical.

FIG. 14 illustrates another embodiment of a jelly roll electrode assembly having a resistor sheet. In this embodiment, a series of resistor sheets are wrapped around a series of jelly roll assemblies. As shown in FIG. 14, resistor sheets 912a and 912b are wrapped around jelly roll assemblies 913a and 913b. FIG. 14 shows two jelly roll assemblies each having a resistor sheet on the outer circumference thereof. This configuration can be extended to additional jelly roll assemblies some or all of which have a resistor sheet on the outer circumference thereof to form a jelly roll assembly having a series of resistor sheets wrapped around a series of jelly roll assemblies. Such an assembly can be fabricated by winding a jelly roll assembly and then wrapping the resistor sheet on the outer circumference thereof followed by winding additional jelly roll assemblies with or without resistor sheets thereon.

Each of the jelly roll assemblies includes an anode electrode, cathode electrode, and separator. For example jelly roll assemblies 913a and 913b include anode electrode 914 on current collector 915, e.g., a copper foil, first separator 916a, cathode electrode 918 on current collector 919, e.g. an aluminum foil. A second separator can be included after current collector 919, which is not shown in the figure. In addition to having resistor sheets wrapped around the outermost layer of the jelly roll, a resistor sheet can be included in more or less the center of the inner most jelly roll assembly.

FIG. 15 illustrates another embodiment of a jelly roll electrode assembly having a resistor sheet. In this embodiment, the container holding the jelly roll assembly or assemblies can act as the resistor sheet even though it is not in the shape of a sheet. As shown in FIG. 15, resistor sheet 1012 surrounds two jelly roll assemblies 1013a and 1013b. Resistor sheet 1012 has an inner surface 1012a contact a substantial portion of the outermost layer of the jelly roll assemblies. The resistor sheet can be a container holding the assemblies, e.g., a steel can. In this embodiment, resistor sheet 1012 is shaped to have two compartments to hold the two jelly roll assemblies but this embodiment is not limited to such a shape so long as an inner surface of resistor sheet 1012 contacts a substantial portion of at least one of the jelly roll assemblies, the resistor sheet can function as described in the present disclosure. In addition, the configuration of FIG. 15 can be extended to additional jelly roll assemblies some or all of which are positioned in one or more compartments or contact the resistor sheet.

Each of the jelly roll assemblies includes an anode electrode, first separator, cathode electrode, and second separator. For example jelly roll assemblies 1013a and 1013b include anode electrode 1014 on current collector 1015, e.g., a copper foil, first separator 1016a, cathode electrode 1018 on current collector 1019, e.g. an aluminum foil. A second separator can be included after current collector 919, which is not shown in the figure. In addition to resistor sheet 1012, a resistor sheet can be included in more or less the center of one or all of the jelly roll assemblies in this embodiment.

While the battery configurations in FIGS. 13, 14 and 15 are illustrated as jelly rolls that having an asymmetrical shape, the jelly rolls and resistor sheets can be symmetrical, such as cylindrical jelly roll assemblies with corresponding cylindrical resistor sheets.

In addition to the elements illustrated in FIGS. 13, 14 and 15, additional elements are included to form working batteries with the configurations of FIGS. 13, 14 and 15, which were not shown for illustrative convenience. These elements include, for example, a high resistance terminal electrically connected to the resistor sheet as part of a high electrical resistance level circuit; a low resistance terminal which is electrically connected to the resistor sheet and to one of the electrodes, e.g., the anode or cathode electrodes, to form a low electrical resistance circuit; a switch that can electrically connect or disconnect the low resistance and high resistance terminals. The rechargeable battery 810, 910 and 1010 of FIGS. 13, 14 and 15, respectively, can be operated in the same manner as described for FIG. 5, for example.

In another embodiment of the present disclosure, one or more of the resistor sheets shown in FIG. 7 or 8 can be used in the configurations of FIGS. 13, 14 and 15. For example, for any resistor sheet in FIG. 7, the tabs labeled as Tab 1 can be connected to the negative terminals of the cells, forming a low-resistance terminal for the battery, LoR(−). Tab 2 of any of the resistor sheets shown in FIG. 7 can be welded together to form the high resistance terminal of the battery, HiR(−). The activation and operation of such a battery is the same as described for the battery of FIG. 5.

All afore-described battery designs are applicable to rechargeable batteries such as Li-ion, nickel-metal hydride, lead-acid, etc. Advantageously, the rechargeable battery of the present disclosure can be implemented for all battery chemistries, such as rechargeable lithium ion, nickel-metal hydride, or advanced lithium batteries such as lithium-sulfur, lithium-polymer, lithium-air batteries or all solid-state batteries, and for all form factors, either pouch, cylindrical, prismatic or angular. The cell designs and components described above for FIGS. 5-15 can be used to fabricate an ohmically modulated rechargeable battery with a low internal resistance ($R_1$) for one set of terminals and a high internal resistance ($R_2$) for a second set of terminals. The cell structure can accommodate rolled electrode and stacked electrode designs, among others.

Additional configurations for implementing an ohmically modulated rechargeable battery are also described herein. These additional configurations can be used alone or in combination with the configurations described above. For example, an ohmically modulated rechargeable battery can separately or additionally include one or more positive temperature coefficient (PTC) materials to change the internal resistance of the battery at a threshold temperature. PTC materials are characterized by a sharp increase in electrical resistance when a certain temperature is exceeded, typically in the range of about 80-130° C. As such, they are suited for use in an ohmically modulated rechargeable battery. There are polymer PTCs, such as epoxy-carbon composites, ceramic PTCs, such as doped polycrystalline ceramic containing barium titanate, etc. among other PTC materials that are suitable for use in an OMB.

In another embodiment of the present disclosure, an OMB is configured with an electrode, a cathode or anode electrode, including one or more PTC materials Advantageously, the one or more PTC materials can be included in the electrode as either a conducting agent mixed with the electrode slurry when fabricating the electrode, or a thin coating on the surface of one or more active materials of the electrode, or an interfacial coating interposed between the active materials and current-collecting foil of an electrode.

The PTC material can also be included as a coating onto the tabs of the electrode by coating the tabs prior to assembling the electrode thereby including a layer of the PTC in the tabs of the electrode.

For example, an electrode for an OMB can be fabricated by mixing one or more PTC materials such as epoxy-carbon composites, with a slurry for fabricating a cathode electrode, which further includes a PVdF binder and NMP solvent. An anode electrode including one or more PTC materials, such as epoxy-carbon composites or doped polycrystalline ceramic containing barium titanate, can also be fabricated by mixing the PTC material with a SBR/CMC binder. After drying, the PTC conducting agent provides great electrode conductivity in the normal operating range of temperatures but jumps in resistance by several orders of magnitude when the battery temperature goes beyond $T_2$. The one or more PTC materials is preferably included in the electrode at a range of about 0.5-5% by weight relative to the entire electrode slurry.

Another aspect of the present disclosure is to use PTC materials as a thin coating on the surface of active material particles or an interfacial coating interposed between the active materials and current-collecting foil. The amount of PTC material in such a configuration is preferably 0.5-5 wt %.

Yet another aspect of the present disclosure is to use PTC materials as a thin coating on all tabs or on some tabs before they are pressed together. When internal shorting occurs, there is large current flowing through tabs, which generates intense heat and raises the tab temperature above $T_2$. As shown in FIG. 1, the internal resistance level of such a battery jumps sharply to a second, higher internal resistance. Thereafter, the interfacial resistance between tabs sharply increases due to the PTC material characteristic which effectively curbs the current flowing through the tabs and hence minimizes thermal runaway.

In another embodiment of the present disclosure, an OMB is configured with an electrode, a cathode or anode electrode, including one or more thermally expandable polymers. Such thermally expandable polymers include Poly (ethylene). These polymers expand dramatically upon heating, thereby creating a large increase in resistance when used as binders or large increase in ionic resistance when used as pore fillers (due to restricting pore volume and increasing pore tortuosity for ion transport). Both results in a dramatic increase in battery resistance as the battery temperature is sufficiently high. As such, these thermally expandable polymers are suitable for use in the OMB of the present disclosure. The present embodiment is intended to shut down electrodes as opposed to conventional separator shutdown through polymer melting. It is much more effective to shut down electrodes where there are energy sources and even partial shutdown of electrodes is helpful to enhance battery safety as the total energy releasable during abuse conditions is reduced. In contrast, partial shutdown of separators over a large surface area does not work sufficiently because ionic current can bypass the shutdown spots and continue to allow the battery to release energy under abuse conditions.

One aspect of the disclosure is to use thermally expandable polymers as a binder in electrode making or a binder in making a conductive glue to coat at the interface between active materials and current-collecting foil.

Yet another aspect of the present disclosure is to use thermally expandable polymers as a pore filler for porous electrodes. Upon heating to the temperature $T_2$, the polymer will expand substantially, thereby dramatically restricting ionic conduction path and increasing ohmic resistance of the OMB.

Another aspect of the present disclosure includes a rechargeable battery having a multi-level profile of battery resistance with step changes at more than one threshold temperature. Such a profile can provide multiple layers of defense. Such a profile can be created by using a combination of all afore-described configurations.

For example, a rechargeable battery can be configured to include one or more resistor sheets with a high-current switch set at $T_2$ to effect a step increase from a low resistance $R_1$ to a high resistance $R_2$. Additional incorporation of a PTC material in the battery can set off the second resistance jump from $R_2$ to a higher resistance $R_3$ at a higher threshold temperature $T_3$. The additional resistance level above $T_3$ provides a double defense mechanism for the battery and improves its safety at elevated temperatures.

Another embodiment of OMB having a profile as shown in FIG. 4, is for an internal resistor sheet to effect the resistance jump $\Delta R_{12}=R_2-R_1$, but to use an external resistor sheet to effect the resistance jump $\Delta R_{23}=R_3-R_2$. Further, the external resistor sheet is thermally insulated from the battery cell such that the heat generated within the external resistor sheet does not transfer to the battery cell. This further enhances battery safety. Also, two independently controlled switches may be used: one to activate the resistance jump $\Delta R_{12}$ and the other to activate the resistance jump $\Delta R_{23}$.

Another embodiment of the present disclosure is a battery system wherein control strategies are implemented based on the principle of ohmic modulation with temperature to enhance battery safety. One control strategy is that once an unusually high battery resistance is detected electrically, the electrical system will be entirely shut down and the cooling system is activated to curb further temperature rise. In one aspect of the present disclosure, a rechargeable battery is operated $R_1$ when the temperature of the battery is between $T_1$ and $T_2$, and at $R_2$ outside of either $T_1$ or $T_2$ by activating a switch that activates $R_2$ when the temperature of the battery is outside of either $T_1$ or $T_2$.

EXAMPLE

The following example is intended to further illustrate certain preferred embodiments of the invention and is not limiting in nature. Those skilled in the art will recognize, or be able to ascertain, using no more than routine experimentation, numerous equivalents to the specific substances and procedures described herein.

A pilot-production battery of 26 Ah, in the form of a pouch cell and made of lithium-nickel-manganese-cobalt (NMC) cathode and graphite anode, was developed according to the construction described in FIG. 5. The resistor sheet is a stainless steel foil of 25 cm long, 6 cm wide and 100 um thick. Its resistance is approximately 0.05 Ohm and its weight is ~13 grams which is about 2.3% of the total battery weight. The switch between the LoR(−) and HiR(−) terminals is done by an electromechanical relay driven by a temperature controller, which is set to OPEN at ~45° C. External shorting of the fully charged OMB by an 8 mΩ resistor is carried out, and battery current and temperature are recorded. A baseline cell without the OMB features but remaining otherwise identical was also tested for a comparative study.

Test results of the OMB (labeled as OMB in FIG. 16) and the baseline battery (labeled as cony. LiB in FIG. 13) in 8 mΩ external shorting are shown in FIG. 16A and FIG. 16B.

In the case of OMB, it is clearly seen that the shorting current abruptly dropped from ~370 A to ~60 A when the battery resistance switches to the higher value $R_2$ at ~45° C. This is almost 6.2 times reduction in shorting current, thereby offering much improved safety characteristics. FIG. 16B compares the battery temperature responses of OMB and the baseline battery. Again, it is seen that the battery temperature of OMB remains lower than that of cony. LIB after the resistance jump at 45° C. The OMB is therefore less prone to thermal runaway.

While the aforementioned external shorting results are shown for a Li-ion battery, ohmically modulated batteries based on advanced Li-ion batteries, nickel-metal hydride (Ni-MH), lead-acid (Pb-acid) and other battery chemistries is expected to have the same advantages.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. An ohmically modulated rechargeable battery comprising one level of internal resistance ($R_1$) over a temperature range of the battery between a first temperature ($T_1$) and a second temperature ($T_2$), and a second level of internal resistance ($R_2$) outside of $T_1$ and $T_2$, wherein the value of $R_2$ at about 2° C. below $T_1$ is 2 to 50 times the value of $R_1$ at $T_1$ and the value of $R_2$ at about 2° C. above $T_2$ is 2 to 50 times the value of $R_1$ at $T_2$.

2. The rechargeable battery according to claim 1, wherein $T_2$ is a temperature having a value within a range between about 45° C. and about 130° C.

3. The rechargeable battery according to claim 1, wherein the battery comprises a third level of internal resistance ($R_3$) when the battery reaches a third temperature ($T_3$) wherein the value of $R_3$ at about 2° C. above $T_3$ is at least twice the value of $R_2$ at $T_3$ and wherein $T_3$ is a temperature having a value within a range between 80° C. and 130° C.

4. The rechargeable battery according to claim 1, comprising
at least one negative terminal and at least one positive terminal for operating the battery at $R_1$;
at least one high resistance terminal for operating the battery at $R_2$; and
a switch that activates $R_2$ when the temperature of the battery is outside of either $T_1$ or $T_2$.

5. The rechargeable battery according to claim 4, wherein the at least one high resistance terminal is electrically connected to at least one resistor sheet within a cell of the battery or between cells of the battery.

6. The rechargeable battery according to claim 4, wherein the at least one high resistance terminal for operating the battery at $R_2$ is an additional negative terminal.

7. The rechargeable battery according to claim 4, wherein the switch is driven by a temperature sensor for switching between the terminals for operating the battery at $R_1$ and the terminals for operating the battery at $R_2$.

8. The rechargeable battery according to claim 5, wherein the at least one resistor sheet is made of graphite, highly ordered pyrolytic graphite (HOPG), stainless steel, nickel, chrome, nichrome, copper, aluminum, titanium, or combinations thereof.

9. The rechargeable battery according to claim 5, wherein the at least one resistor sheet has a resistance in units of Ohm equal to the numerical value of between 0.1 to 5 divided by the battery's capacity in Amp-hours (Ah).

10. The rechargeable battery according to claim 5, wherein the at least one resistor sheet is sandwiched inside an electrode-separator stack or a jelly roll.

11. The rechargeable battery according to claim 5, wherein the at least one resistor sheet is interposed between tabs of a battery cell, or subgroups of tabs of a battery, or tabs of multiple battery cells.

12. The rechargeable battery according to claim 5, wherein the at least one resistor sheet is configured to have two tabs, with one tab electrically connected to other electrode tabs in the battery to form a low-resistance terminal, and the other tab of the at least one resistor sheet forming the at least one high-resistance terminal.

13. The rechargeable battery according to claim 5, wherein the at least one resistor sheet is the same as either or both of the two metal current collectors used in a battery cell, or a portion of the two metal current collectors.

14. A battery system comprising the ohmically modulated battery according to claim 1 and a controller that can switch between operating the battery at $R_1$ and operating the battery at $R_2$ and a temperature sensor for determining the temperature of $T_1$ and $T_2$.

15. A rechargeable battery comprising:
at least one negative terminal and at least one positive terminal for operating the battery at having a low internal resistance level ($R_1$) over a temperature range of the battery between a first temperature ($T_1$) and a second temperature ($T_2$);
at least one high resistance terminal having a high internal resistance level ($R_2$) outside of either $T_1$ or $T_2$;
at least one resistor sheet electrically connected to and forming $R_2$ with the at least one high resistance terminal, wherein the at least one resistor sheet is within a cell of the battery or between cells of the battery; and
a switch that electrically connects or disconnects the at least one high resistance terminal with either the at least one positive or the at least one negative terminal having the low internal resistance level;
wherein the value of $R_2$ at about 2° C. below $T_1$ is at least twice the value of $R_1$ at $T_1$ or the value of $R_2$ at about 2° C. above $T_2$ is at least twice the value of $R_1$ at $T_2$.

16. The rechargeable battery according to claim 15, wherein the resistor sheet is flat with a large surface.

17. The rechargeable battery according to claim 16, wherein the battery is a lithium ion battery.

18. The rechargeable battery according to claim 16, wherein the at least one resistor sheet has a thickness between about 1 micrometer and about 150 micrometers.

19. The rechargeable battery according to claim 16, wherein the at least one resistor sheet is made of graphite, highly ordered pyrolytic graphite (HOPG), stainless steel, nickel, chrome, nichrome, copper, aluminum, titanium, or combinations thereof.

20. The rechargeable battery according to claim 16, wherein the at least one resistor sheet has a resistance in units of Ohm equal to the numerical value of between 0.1 to 5 divided by the battery's capacity in Amp-hours (Ah).

21. The rechargeable battery according to claim 15, wherein the at least one resistor sheet is within the cell of the battery.

* * * * *